US011062016B2

(12) United States Patent
Kerai et al.

(10) Patent No.: US 11,062,016 B2
(45) Date of Patent: Jul. 13, 2021

(54) SYSTEMS AND METHODS FOR VERIFYING USER CREDENTIALS FOR SEARCH

(71) Applicant: Splunk Inc., San Francisco, CA (US)

(72) Inventors: Jagannath Kerai, Cupertino, CA (US); Rama Gopalan, San Jose, CA (US)

(73) Assignee: Splunk Inc., San Francisco, CA (US)

(*) Notice: Subject to any disclaimer, the term of this patent is extended or adjusted under 35 U.S.C. 154(b) by 355 days.

(21) Appl. No.: 14/695,827

(22) Filed: Apr. 24, 2015

(65) Prior Publication Data

US 2016/0314211 A1  Oct. 27, 2016

(51) Int. Cl.
G06F 21/45 (2013.01)
G06F 21/62 (2013.01)
G06F 21/30 (2013.01)
H04L 29/06 (2006.01)

(52) U.S. Cl.
CPC ............ *G06F 21/45* (2013.01); *G06F 21/30* (2013.01); *G06F 21/62* (2013.01); *G06F 21/6218* (2013.01); *G06F 21/6227* (2013.01); *H04L 63/10* (2013.01)

(58) Field of Classification Search
CPC ......... G06F 21/30–35; G06F 21/40–45; G06F 21/60–629; H04L 9/32–3297; H04L 63/08–0892; H04L 63/10–108
See application file for complete search history.

(56) References Cited

U.S. PATENT DOCUMENTS

| 6,769,068 B1 * | 7/2004 | Brozowski | H04L 63/08 726/1 |
| 7,503,063 B1 * | 3/2009 | Mishra | G06F 21/6218 726/2 |
| 7,711,738 B1 * | 5/2010 | Kraft | G06F 17/3089 707/752 |
| 8,316,419 B2 * | 11/2012 | Oulahal | H04W 8/20 726/4 |
| 8,806,361 B1 * | 8/2014 | Noel | G06F 3/0484 715/771 |

(Continued)

OTHER PUBLICATIONS

Kher, Vishal, and Yongdae Kim. "Securing distributed storage: challenges, techniques, and systems." Proceedings of the 2005 ACM workshop on Storage security and survivability. 2005. (Year: 2005).*

*Primary Examiner* — Madhuri R Herzog

(74) *Attorney, Agent, or Firm* — Ferguson Braswell Fraser Kubasta PC

(57) ABSTRACT

Provided are systems and methods for verifying user credentials for performing a search. In one embodiment, a method can be provided that includes receiving a request to perform a search of machine generated data comprising time stamped events that is associated with a user, determining whether a set of cached user credentials has been updated within a period of time, querying, in response to determining that the credentials for the user have not been updated within the period of time, an identity provider server for a current set of user credentials associated with the user, receiving the current set of user credentials, determining whether the user has privileges to perform the search based at least in part on the set of user credentials, and causing, in response to determining that the user has privileges to perform the search, the search to be performed to identify one or more of the events that are responsive to the search.

29 Claims, 17 Drawing Sheets

(56) References Cited

U.S. PATENT DOCUMENTS

| | | | |
|---|---|---|---|
| 9,367,610 B2 * | 6/2016 | Damodaran | G06F 17/30734 |
| 9,516,018 B1 * | 12/2016 | Vazquez | H04L 63/0853 |
| 2007/0124807 A1 * | 5/2007 | Jau | H04L 63/0846 726/6 |
| 2008/0134305 A1 * | 6/2008 | Hinton | H04L 63/08 726/5 |
| 2009/0007250 A1 * | 1/2009 | Pouzin | G06F 21/335 726/10 |
| 2011/0078108 A1 * | 3/2011 | Kumar | G06F 11/3495 707/602 |
| 2014/0172867 A1 * | 6/2014 | Lin | G06F 16/2272 707/741 |
| 2014/0237564 A1 * | 8/2014 | Dudziak | H04L 63/08 726/6 |
| 2016/0142408 A1 * | 5/2016 | Raepple | H04L 9/3213 726/9 |

\* cited by examiner

```
Original Search: 1501
search "error" | stats count BY host

Sent to peers: 1502
search "error" | prestats count BY host(map)

Executed by search head: 1503
Merge prestats results received from peers (reduce)
```

SYSTEMS AND METHODS FOR VERIFYING USER CREDENTIALS FOR SEARCH

TECHNICAL FIELD

The present disclosure is generally directed to searching, and more particularly, to systems and methods for verifying user credentials for search.

BACKGROUND

Modern data centers often comprise thousands of hosts that operate collectively to service requests from even larger numbers of remote clients. During operation, components of these data centers can produce significant volumes of machine-generated data. The machine generated data is often stored in searchable indexes. Users often employ a search application to search the indexed machine-generated data, to access reports on the indexed machine generated data, and the like. In some instances, certain functionality, such as searching and reporting features, available to a user can be dependent on what privileges the user has.

BRIEF DESCRIPTION OF THE DRAWINGS

FIG. 9 illustrates an exemplary search query received from a client and executed by search peers in accordance with the disclosed embodiments.

FIG. 10B illustrates an exemplary data summary dialog that enables a user to select various data sources in accordance with the disclosed embodiments.

DETAILED DESCRIPTION

Figure 1:
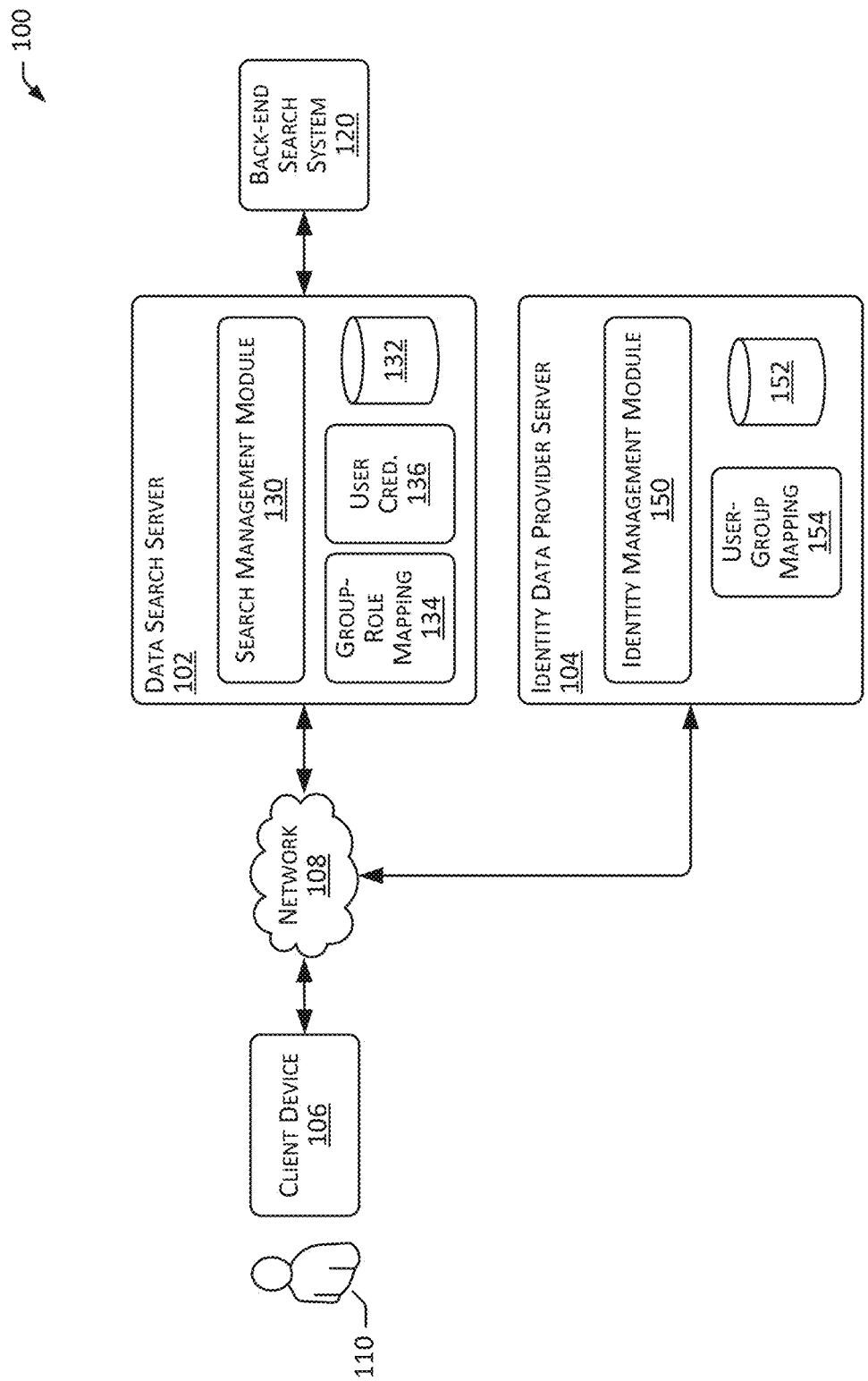
FIG. 1 illustrates an example data processing environment in accordance with the disclosed embodiments.

The present disclosure is directed to verifying user credentials for searching. In some embodiments, user credentials can be verified prior to conducting a search that is associated with a user. For example, if a user requests to conduct a search of machine-generated data to locate segments of the data (such as "events" described herein) that satisfy specified search criteria, the user's credentials can be verified prior to conducting the search. In some embodiments, the credentials can be retrieved from a local cache memory, and do not need to be from a remote location, such as an identity service provider (IDP). As described herein, in some embodiments, the verifying search credentials can be applied to searches of machine-data that employ a late-binding schema. For example, the describe verification of user credentials can be conducted at search time, for a search that employs a late-binding schema to identify one or more event records of a set of indexed event records that each include a portion of raw-machine generated data and are each time-stamped or otherwise associated with a particular time.

In some embodiments, user credentials can be cached (e.g., stored in local cache memory), and the cached credentials can be used for verifying that a user associated with a search has sufficient privileges to conduct the search. For example, at some point a search server may query an IDP server for a user's credentials, receive the credentials for the user from the IDP server, and store the credentials in the server's cache memory. In response to determining that a search associated with the user is to be conducted, the search server may assess the cached credentials for the user to determine whether the user has sufficient privileges to conduct the search. If the cached credentials indicate that the user does have sufficient privileges to conduct the search, then the search server may proceed to conduct the search. Conversely, if the cached credentials indicate that the user does not have sufficient privileges to conduct the search, then the search server may not conduct the search.

In some embodiments, user credentials can be retrieved from an IDP. For example, in response to determining that a search associated with a user is to be conducted, a search server may query an IDP server for the user's credentials, receive the credentials for the user from the IDP server, cache the received credentials, and assess the received credentials to determine whether the user has sufficient privileges to conduct the search. If the credentials indicate that the user does have sufficient privileges to conduct the search, then the search server may proceed to conduct the search. Conversely, if the credentials indicate that the user does not have sufficient privileges to conduct the search, then the search server may not conduct the search.

In some embodiments, cached user credentials can be used for verifying user search privileges when they are relatively new and updated credentials can be retrieved and used for verifying user search privileges when the cached user credentials are relatively old. For example, in response to determining that a search associated with a user is to be conducted, a search server may determine whether the currently cached credentials for the user have been updated recently (e.g., within about the last 1 hour, 8 hours, 24 hours, and/or the like). If the search server determines that the cached credentials have been updated recently, then the search server may assess the cached credentials to determine whether the user has sufficient privileges to conduct the search. If, however, the search server determines that the cached credentials have not been updated recently, then the search server may query the IDP server for an updated set of credentials for the user. The search server may, then, use the credentials that are received from the IDP server to determine whether the user has sufficient privileges to conduct the search. In such an embodiment, the search server may store the updated set of credentials for the user in cache memory. For example, the search server may replace the previously stored set of cached credentials for the user with the updated set of credentials for the user just received from the IDP. Thus, in some embodiments, cached credentials may be used to verify a user's privileges to conduct a search when they are relatively new, but an updated set of credentials may be retrieved and used to verify a user's privileges to conduct a search when the cached credentials are relatively old. Such embodiments can help to reduce the overhead associated with verifying user credentials for searching. For example, a search server may only query an IDP server for a user's credentials when the cached credentials for the user are outdated, as opposed to querying the IDP server for the user's credentials each and every time a search associated with the user is executed.

Certain embodiments described herein can be particularly useful in the case of scheduled searches. A scheduled search may include a search that is run multiple times on a schedule. For example, a user may schedule a search of machine-generated data to occur every 5 minutes starting at 1 pm and, thus, corresponding scheduled searches may occur at about 1:00 pm, 1:05 pm, 1:10 pm and so forth. An example of the reduction in overhead that may be provided by some embodiments can be illustrated in the following manner. If cached user credentials are set to expire after about 1 hour, then in response to the above described scheduled searches by a user, at about 1 pm the search server may query the IDP server for an initial set of credentials for the user, cache the initial set of credentials, determine that the user has sufficient privileges to conduct the search (based on the initial set of credentials), and conduct the search. At each of about 1:05 pm, 1:10 pm and so forth, up to 1:55 pm (corresponding to the times of the scheduled searches), the search server may determine that the search needs to be conducted, determine that the cached credentials have not yet expired (e.g., the cached credentials are still less than about 1 hour old), determine that the user has sufficient privileges to conduct the search (based on the unexpired set of cached set of credentials), and conduct the search at each of the respective times. At about 2:00 pm, the search server may again determine that the search needs to be conducted, but may determine that the cached credentials have expired (e.g., the cached credentials are more than about 1 hour old). In response to this determination, the search server may once again query the IDP server for a second/updated set of credentials for the user, cache the second set of credentials, determine that the user has sufficient privileges to conduct the search (based on the second set of credentials) and conduct the search. This sequence may be repeated as the scheduled searches continue. Thus, in this illustrative embodiment, the search server may only query the IDP server for the user's credentials about once per hour, despite conducting about 20 scheduled searches per hour. This may significantly reduce overhead, especially when, for example, a large number of scheduled searches are being conducted in parallel.

In some embodiments, at least some of the searches associated with a user can be conducted when the user in not logged-in to the search system. For example, a user can log-in to a search application at about 12:03 pm, create a scheduled search of machine-generated data to occur every 5 minutes starting at 1 pm. The user can log-out of the application at about 12:30 pm, and the search server may conduct corresponding scheduled searches at about 1:00 pm, 1:05 pm, 1:10 pm and so forth. Thus, in some embodiments, the use of user's cached credentials to verify that the user has sufficient privileges to conduct the search and/or the querying of an IDP for the user's credentials can occur while the user not logged-in to the search system.

In some embodiments, user credentials can indicate a group that the user is associated with, and the group can be used to determine whether the user has sufficient privileges to conduct a search. For example, a set of user credentials may indicate that the user "John Doe" is in the "Engineering" group and the Engineering group may be mapped to an "Admin" role. In response to determining that a search associated with the user John Doe is to be conducted, a search server may determine that the search requires an Admin role (and cannot be conducted by a user having a User role), the search server may assess the set of credentials for John Doe to determine that John Doe is associated with the Engineering group, the search server may use a group-role mapping (e.g., mapping the Engineering group to the Admin role) to determine that the Engineering group is associated with the Admin role, the search server may compare the determined Admin role to the required role of Admin to determine that the search can be conducted based on John Doe (the user associated with the search) having the required role, and the search server may proceed to conduct the search. As a further example, if John Doe's role later changes to the "Sales" group, and the credentials (e.g., the cached credentials) for John Doe are updated to reflect his new role, then in response to determining that a search associated with the user John Doe is to be conducted, the search server may assess the set of updated set of credentials for John Doe to determine that John Doe is now associated with the Sales group, the search server may use a group-role mapping (e.g., mapping the Engineering group to the User role) to determine that the Sales group is associated with the User role, the search server may compare the determined User role to the required role of Admin to determine that the search cannot be conducted based on John Doe (the user associated with the search) not having the required role, and the search server may not proceed to conduct the search. Thus, using the cached credentials of a user associated with a search, the search server may be able to automatically allow or deny execution of the search as the credentials for the user change.

Turning now to the figures, FIG. 1 illustrates an example data processing environment ("environment") 100 in accordance with the disclosed embodiments. In some embodiments, the environment 100 can include a data search server ("search server") 102, an identity data provider (IDP) server 104 and one or more client devices 106 communicatively coupled to one another via a communications network 108. The client device 106 may be used or otherwise accessed by a user 110, such as a system administrator or a customer. The search server 102 may be communicatively coupled to a back-end search system 120. The back-end search system 120 may be similar to that of search system 1100 described in more detail below with regard to at least FIG. 5. For example, the back-end search system 120 can include data sources, forwarders, indexers, index data stores, search heads and/or the like components that facilitate the intake, storage and processing of machine-generated data.

The network 108 may include an element or system that facilitates communication between the entities of the environment 100, including, for example, the search server 102, the IDP server 104, the one or more client devices 106 and/or the like. The network 108 may include an electronic communications network, such as the Internet, a local area network (LAN), a wide area network (WAN), a wireless local area network (WLAN), a cellular communications network, and/or the like. In some embodiments, the network 108 can include a wired or a wireless network. In some embodiments, the network 108 can include a single network or a combination of networks.

A client device 106 may include any variety of electronic devices. In some embodiments, a client device 106 can include a device capable of communicating information via the network 108. A client device 106 may include one or more computer devices, such as a desktop computer, a server, a laptop computer, a tablet computer, a wearable computer device, a personal digital assistant (PDA), a smart phone, and/or the like. In some embodiments, a client device 106 may be a client of the search server 102 and/or the IDP server 104. In some embodiments, a client device 106 can include various input/output (I/O) interfaces, such as a display (e.g., for displaying graphical user interfaces (GUIs)), an audible output user interface (e.g., a speaker), an audible input user interface (e.g., a microphone), an image acquisition interface (e.g., a camera), a keyboard, a pointer/ selection device (e.g., a mouse, a trackball, a touchpad, a touchscreen, a gesture capture or detecting device, or a stylus), and/or the like. In some embodiments, a client device 106 can include general computing components and/or embedded systems optimized with specific components for performing specific tasks. In some embodiments, a client device 106 can include programs/applications that can be used to generate a request for content, to provide content, to render content, and/or to send and/or receive requests to and/or from other devices via the network 108. For example, a client device 106 may include an Internet browser application or a local data search and reporting application that facilitates communication with servers, such as the search server 102 and/or the IDP server 104, via the network 108. In some embodiments, a program or application of a client device 106 can include program modules having program instructions that are executable by a computer system to perform some or all of the functionality described herein with regard to at least the client device 106. In some embodiments, a client device 106 can include one or more computer systems similar to that of the computer system 1000 described below with regard to at least FIG. 4.

The IDP server 104 may include a computing device having network connectivity and being capable of providing one or more services to network clients, such as a client device 106 and/or search server 102. These services can include, for example, authenticating users at log-in, providing user credentials, and/or the like. The IDP server 104 may be responsible for (a) providing identifiers for users looking to interact with a system (e.g., search server 102), and (b) asserting to such a system that such an identifier presented by a user is known to the provider, and (c) possibly providing other information about the user that is known to the provider (e.g., user credentials). The IDP server 104 may communicate with the search server 102 and other entities using Security Assertion Markup Language (SAML). SAML may be an XML-based, open-standard data format for exchanging authentication and authorization data between parties, in particular, between an identity provider (e.g., the IDP server 104) and a service provider (e.g., search server 102). Thus, for example, communications exchanged between the IDP server 104 and the search server 102, such as request for user authentication, request for user credentials and messages including user credentials, may be accomplished using SAML. The IDP server 104 may include an identity management module 150 and a data store 152. The management module 150 may provide for executing some or all of the functionality described herein with regard to the IDP server 104. The data store 152 may include a medium for the storage of data thereon. For example, the data store 152 may include a non-transitory computer-readable medium storing the identity management module 150 (e.g., storing the executable code of the identity management module 150), a user-group mapping 154, and/or the like. As described herein a user-group mapping 154 may include a mapping of one or more users (e.g., John Doe, Jennifer Smith, and/or the like) to one or more groups (e.g., Sales, Engineering, and/or the like). A user-group mapping 154 can be used, for example, by the IDP server 104 to determine what group a user 110 is assigned to or otherwise associated with based at least in part on an identity of the user 110, such as a user name, provided by the client device 106 and/or the search server 102. Although certain embodiments are described with regard to a single data store 152 for the purpose of illustration, embodiments can include employing multiple data stores 152, such as a plurality of distributed data stores 152. Moreover, although certain embodiments are described with regard to a single IDP server 104 for the purpose of illustration, embodiments can include employing multiple IDP server 104 servers, such as a plurality of distributed IDP servers 104. In some embodiments, the IDP server 104 can include one or more computer systems similar to that of the computer system 1000 described below with regard to at least FIG. 4.

The search server 102 may include a computing device having network connectivity and being capable of providing one or more services to network clients, such as a client device 106. These services can include, for example, ingesting, processing, storing, monitoring, and/or searching data. The search server 102 may include a search management module 130 and a data store 132. The search management module 130 may provide for executing some or all of the functionality described herein with regard to the search server 102. The data store 132 may include a medium for the storage of data thereon. For example, the data store 132 may include a non-transitory computer-readable medium storing the search management module 130 (e.g., storing the executable code of the search management module 130), a group-role mapping 134, user credentials 136, and/or the like. As described herein a group-role mapping 134 may include a mapping of one or more groups (e.g., Sales, Engineering, and/or the like) to one or more type of roles (e.g., Admin, User, and/or the like). A group-role mapping 134 can be used, for example, by the search management module 130 to determine what role a user 110 is assigned to or otherwise associated with based at least in part on a group identified for the user 110, such as a group indicated in credentials for the user 110 provided by the IDP server 104. As described herein user credentials 136 can include an indication of one or more groups associated with one more users 110 (e.g., John_Doe:Engineering, and/or the like). In some embodiments, the credentials 136 can be stored in a memory of the search server 102, such as cache memory of the data store 132. User credentials 136 stored in cache memory may be referred to as "cached credentials". Although certain embodiments are described with regard to a single data store 132 for the purpose of illustration, embodiments can include employing multiple data stores 132, such as a plurality of distributed data stores 132. Moreover, although certain embodiments are described with regard to a single search server 102 for the purpose of illustration, embodiments can include employing multiple data search servers 102, such as a plurality of distributed data search servers 102. In some embodiments, the search server 102 can include one or more computer systems similar to that of the computer system 1000 described below with regard to at least FIG. 4.

As noted above, the search server 102 may be in communication with one or more components of a back-end search system 120. In some embodiments, the search system 120 can be similar to that of search system 1100 described in more detail below with regard to at least FIG. 5. For example, the back-end search system 102 can include one or more data sources ("sources") (e.g., sources 1105 of FIG. 5), one or more forwarders (e.g., forwarders 1101 of FIG. 5), one or more indexers (e.g., indexers 1102 of FIG. 5), one or more index data stores (e.g., data stores 1103 of FIG. 5), and/or one or more search heads (e.g., search head 1104 of FIG. 5).

As described in more detail below with regard to at least FIGS. 5-11D, in the context of monitoring machine-generated data, forwarders may provide for collecting machine-generated data from one or more data sources, such as data streaming from packaged and custom applications, application servers, web servers, databases, wire data from networks, virtual machines, telecom equipment, operating systems, sensors, and/or the like. Indexers may provide for receiving, indexing, storing, and/or searching the machine-generated data received from the forwarders. Search heads may provide for servicing search requests (e.g., search requests received from the search server 102), including distributing search tasks to one or more indexers, receiving one or more search results from the one or more indexers and merging the search results received from the one or more indexers. A search head may provide the search results to the search server 102. In some embodiments, the search server 102 may provide to the client device 106 for presentation to the user 110, for example, via search results and reports that are served to the client device for presentation to the user 110.

Although the search server 102 is illustrated as a component that is separate from the back-end search system 120 for the purpose of illustration, embodiments can include the search server 102 and/or its functionality being included in or integrated with one or more components of the back-end search system 120. For example, some or all of the components and functionality of the search server 102 can be integrated with or provided by a search head of the back-end search system 120.

Figure 2A:
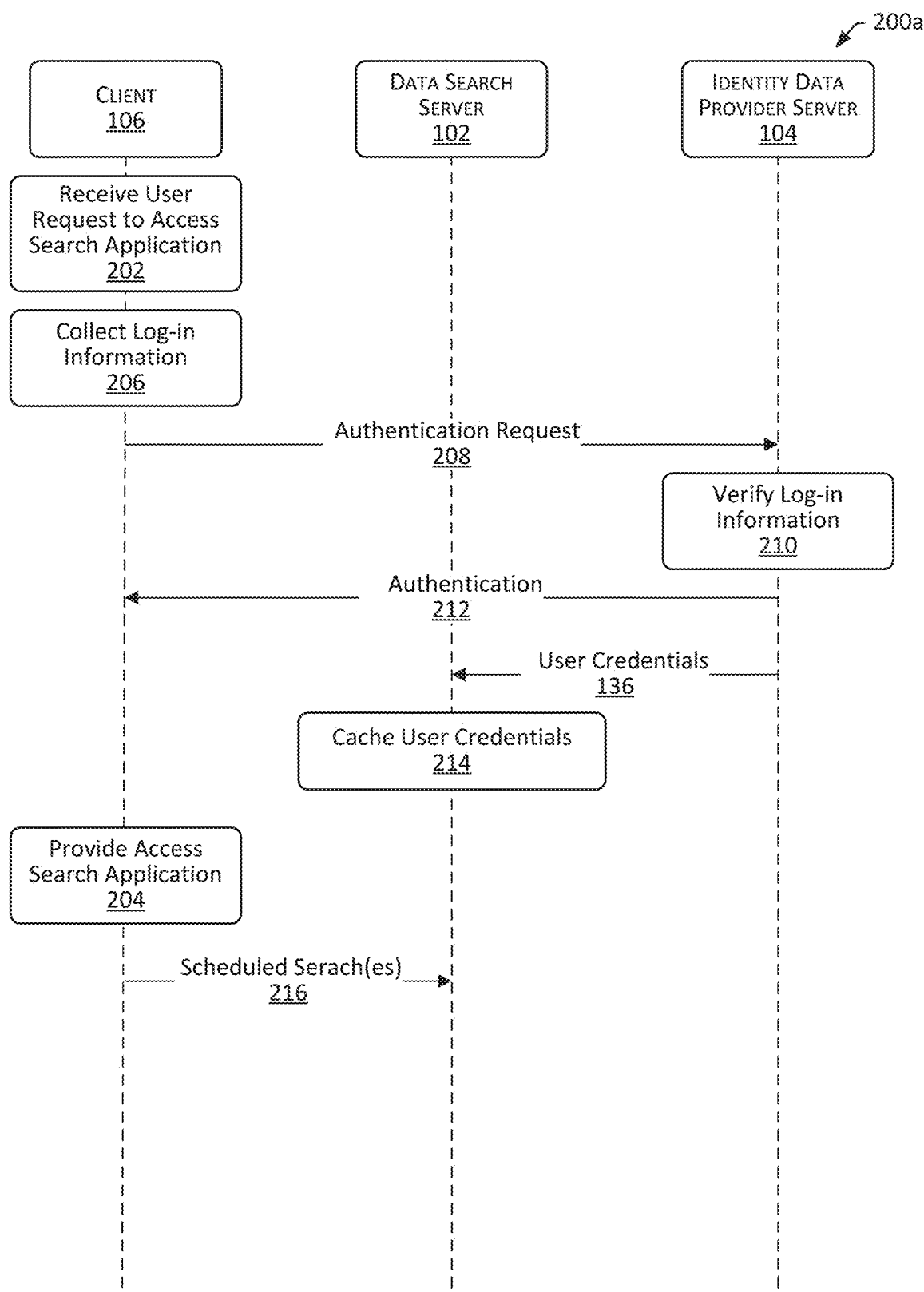
FIGS. 2A-2C are flow diagrams that illustrate exemplary processes for conducting scheduled searches using cached user credentials in accordance with the disclosed embodiments.
Figure 2B:
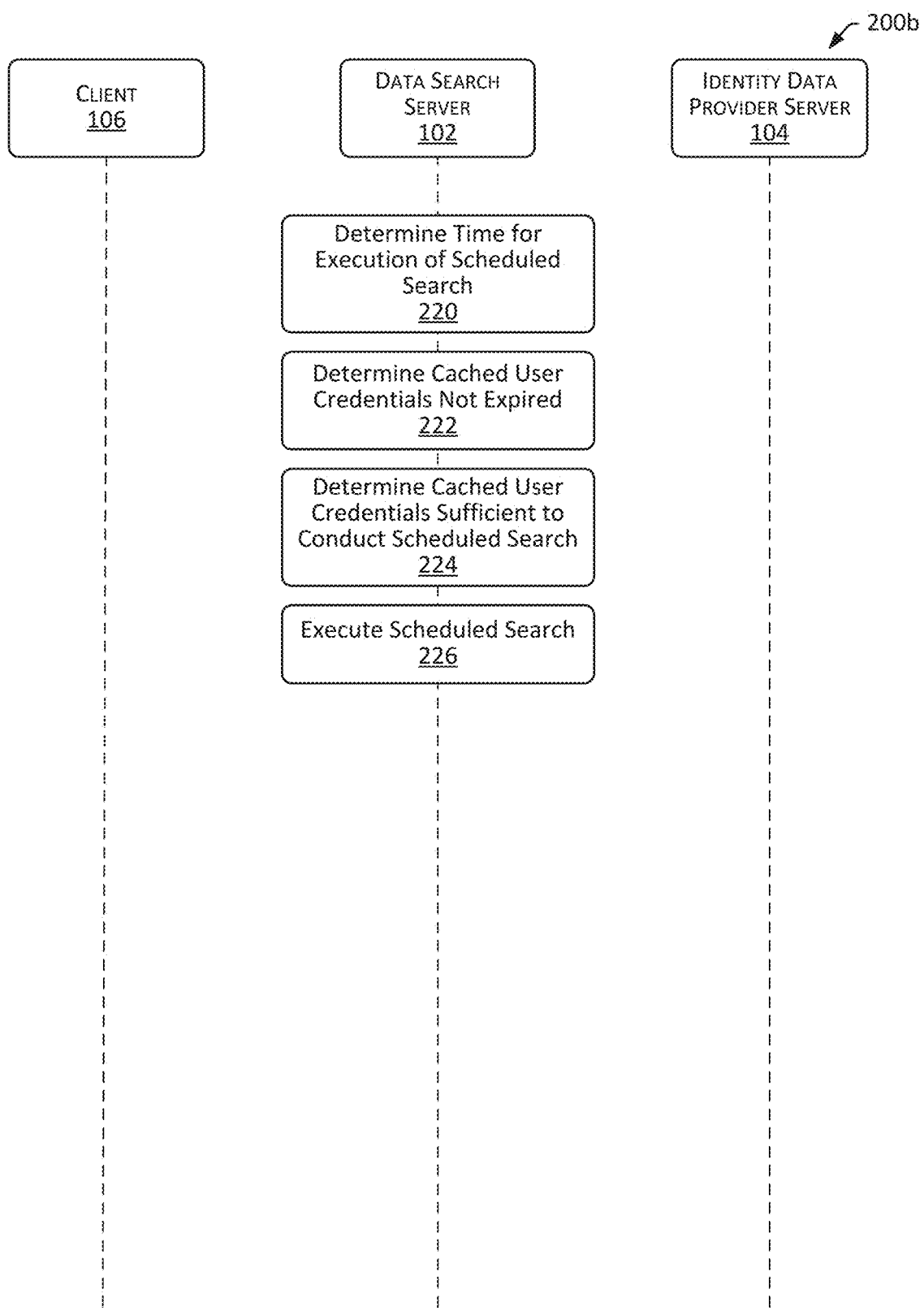
Figure 2C:
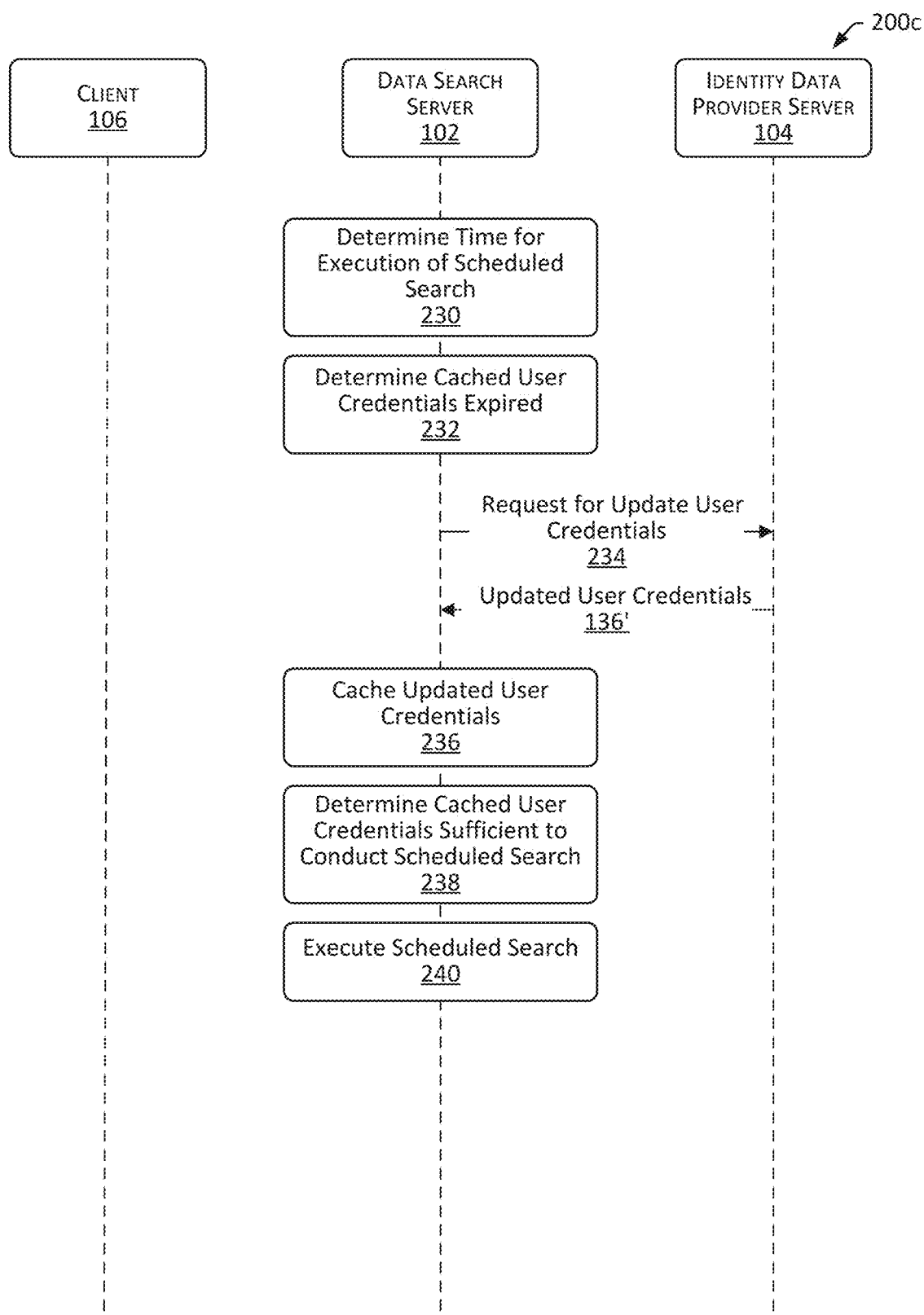

FIGS. 2A-2C are flow diagrams that illustrate example processes 200a, 200b and 200c, respectively, for conducting scheduled searches using cached user credentials in accordance with the disclosed embodiments. FIG. 2A illustrates a first process 200a that includes caching user credentials in conjunction with a successful user log-in. FIG. 2B illustrates a second process 200b that includes using un-expired cached user credentials to verify that a user has sufficient privileges to conduct a search. FIG. 2C illustrates a third process 200c that includes querying an IDP for updated cached user credentials and using the updated cached user credentials to verify that a user has sufficient privileges to conduct a search. Although certain portions of the processes are illustrated in separate figures for the purpose of illustration, embodiments can include the various processes (and/or sub-processes contained therein) being performed in any suitable order. For example, the process 200c may be conducted immediately following the first process 200a if, for example, the cached user credentials expire prior to the time for conducting a first scheduled search.

Referring to FIG. 2A and the process 200a that includes caching user credentials in conjunction with a successful user log-in, a client device 106 may receive a user request to access a search application, as depicted at block 202. For example, the user 110 may, using the client device 106, open or otherwise navigate to a page of a search application serviced by the search server 102. The search application may, for example, allow users to search machine generated data, schedule searches of the machine generated data, generate reports on the machined generated data, and/or the like, as described herein with regard to at least FIGS. 5-11D. If it is determined that the user 110 is currently logged-in to the search application (e.g., the client device 106 has a stored token previously received from the IDP 104 that indicates that the session is valid session), a log-in process may not need to be performed, and the client device 106 may provide the user 110 with the requested access to the search application, as depicted at block 204 and described in more detail below. Conversely, if it is determined that the user 110 is not currently logged-in to the search application (e.g., the client device 106 does not have a stored token from the IDP 104 that indicates that the session is valid session), a log-in process may be conducted to confirm that the user 110 has sufficient privileges to access the search application, prior to providing the requested access to the search application.

In some embodiments, a log-in process can include the client device 106 collecting log-in information from the user 110, as depicted at block 206, and transmitting a corresponding authentication request 208 to the IDP server 104. Collection of log-in information from the user 110 can include, for example, the client device 106 prompting the user 110 for log-in information (e.g., a user name and a password) and collecting the provided log-in information. For example, the client device 106 may display a log-in screen that prompts the user 110 to enter a username and password. The user 110 may enter a username (e.g., John Doe) and a password (e.g., pa$$word) via the log-in screen, and the client device 106 may transmit, to the IDP server 104, a corresponding authentication request 208 that identifies the search application the user 110 is attempting to access, and includes the submitted username (e.g., John Doe) and password (e.g., pa$$word). In some embodiments, the log-in process can include the IDP server 104 verifying the log-in information, as depicted at block 210, and transmitting a corresponding authentication message 212 to the client device 106. For example, the IDP server 104 may compare the username (e.g., John Doe) and a password (e.g., pa$$word) provided in the authentication request 208 to a list of valid user name-password pairs for the search application to determine whether the user name and password are valid. If the IDP server 104 determines that the log-in information provided via the authentication request 208 is not valid (e.g., the provided user name and password does not match any of the user name-password pairs for the search application), the IDP server 104 may return a corresponding message to the client 106 that indicates that the log-in is invalid, and the client 106 may deny the requested access to the search application. For example, the client device 106 may notify the user 110 that the submitted log-in information is not valid, and prompt the user to submit valid log-information (e.g., as described above with regard to block 206). If the IDP server 104 determines that the log-in information provided via the authentication request 208 is valid (e.g., the provided user name and password does match a user name-password pair for the search application), it may return a corresponding authentication message 212 to the client 106 that indicates that the log-in is valid, and the client 106 may provide the requested access to the search application, as depicted at block 204. The authentication message 212 may include, for example, an authentication token that is stored locally at the client device 106, and can be used to verify the user during future attempts to access the application. In response to receiving the authentication message 212, the client device 106 may provide the user with access to features of the application, allowing the user 110 to search machine generated data, schedule searches of the machine generated data, generate reports on the machined generated data, and/or the like.

In some embodiments, the user 110 can submit one or more scheduled searches to the search server 102 via the search application. For example, if the user 110 is interested in monitoring when an e-mail server (e.g., server "A") is experiencing a relatively high processing load, the user 110 may submit a scheduled search 216 for events of the machine data that were generated by an e-mail server (e.g., server "A") in the last 2 hours and that include a field value indicating central proceeding unit (CPU) usage of greater than 75%. The user 110 may further specify that the search of machine-generated data is to occur every 5 minutes starting at 1 pm. If the user 110 logged-in to the application at about 12:03 pm and it is currently 12:30 pm, the search server 102 may schedule the search to occur at about 1:00 pm, 1:05 pm, 1:10 pm and so forth. If the user 110 does not schedule an end time for the search, it may be scheduled to occur indefinitely every 5 minutes, or at least until the user 110 terminates the search. As described in more detail below, such scheduled searches can be used for accelerating other searches, accelerating report generation and/or the like.

In some embodiments, if the IDP server 104 determines that the log-in information provided via the authentication request 208 is valid, the IDP server 104 may transmit a set of user credentials 136 to the search server 102. The set of user credentials 136 can include credentials for the user 110 that has just logged-on. The user credentials 136 may include, for example, an indication of one or more groups (e.g., the "Engineering" group, the "Sales" group, and/or the like) that the user 110 is associated with. In some embodiments, the group can be determined based at least in part on a user-group mapping 154. For example, if a user-group mapping 154 stored in the data store 152 of the IDP server 104 includes a mapping of the user "John Doe" to the group "Engineering", then, in response to determining that the log-in information is valid at block 210, the IDP server 104 may also determine that "John Doe" is associated with the group "Engineering" based on the association specified in the user-group mapping 154. The IDP 104 may transmit a set of user credentials 136 to the search server 102 that indicates that the John Doe is associated with the Engineering group (e.g., including the string "John_Doe:Engineering").

In some embodiments, the search server 102 may cache the set of user credentials 136, as depicted at block 214. Caching the set of user credentials 136 can include storing the received set of user credentials 136 in a local cache memory. Thus, for example, the search server 102 may store, in cache memory of the data store 132, the set of user credentials 136 (e.g., including the string "John_Doe:Engineering") received from the IDP server 104 as a result of the successful log-in by the user 110.

As described herein, in some embodiments, the cached user credentials 136 can be used by the search server 102 to verify whether a user 110 has sufficient privileges to conduct a search or other operation, without having to query the IDP 104 for the user's credentials. For example, as described in more detail below, at search time, the search server 102 can assess the cached user credentials 136 to determine whether they have expired, and if they are not expired, the search server 102 can use the cached user credentials 136 to determine whether the user has sufficient privileges to conduct the search. Conversely, if the cached user credentials 136 are expired, the search server 102 may not use the cached user credentials 136 to determine whether the user has sufficient privileges to conduct the search, but may instead query the IDP server 104 for updated credentials for the user 110 and use the updated user credentials to determine whether the user has sufficient privileges to conduct the search.

Referring to FIG. 2B and process 200b that includes using un-expired cached user credentials to verify that a user has sufficient privileges to conduct a search, the search server 102 may determine that it is time for execution of a scheduled search, as depicted at block 220. Continuing with the above example, if the user 110 schedules searches to occur every 5 minutes starting at 1 pm (e.g., the user 110 schedules searches to occur at 1:00 pm, 1:05 pm, 1:10 pm and so forth), such a determination may be made at about 1:00 pm, 1:05 pm, 1:10 pm and so forth. In response to the determining that it is time for execution of a scheduled search associated with the user 110, the search server 102 may determine that the cached user credentials are not expired, as depicted at block 222. For example, in response to the determining that it is time for execution of the scheduled search associated with the user 110, John Doe (e.g., a scheduled search for events of the machine data that were generated by server A in the last 2 hours and that include a field value indicating central proceeding unit (CPU) usage of greater than 75%), the search server 102 may determine whether the cached credentials 136 for John Doe have expired. In some embodiments, determining whether the cached credentials 136 have expired can include determining when the cached credentials 136 were last updated, and determining whether they were last updated within a threshold period of time. Said another way, determining whether the cached credentials 136 have expired can include determining whether the cached credentials are less than a given age. If for example, the threshold period of time (or age) is 1 hour, the cached credentials 136 were last updated when they were received at log-in at about 12:03 pm and it is currently 1:00 pm (the time for the first of the scheduled searches), then the search server 102 may determine that the cached credentials 136 for John Doe have not yet expired. That is, they were last updated about 57 min ago (e.g., they are about 57 min old), which is less than the threshold period of time (or age) of 1 hour. Conversely, as described in more detail below with regard to block 230 of the process 200c and FIG. 2C, at the time of the second scheduled search (e.g., about 1:05 pm) the search server 102 may determine that the cached credentials 136 for John Doe have expired. That is, they will have been last updated about 62 min ago (e.g., they are about 62 min old), which is greater than the threshold period of time (or age) of 1 hour. In any event, returning to the above example (including the first scheduled search at 1:00 pm), in response to determining that the cached credentials 136 for the user 110 have not yet expired, the search server 102 may proceed to determining that the cached user credentials 136 are sufficient to conduct the scheduled search, as depicted at block 224. In some embodiments, determining whether the cached user credentials 136 are sufficient to conduct a scheduled search can include determining whether the group indicated by the user credentials 136 for the user 110 associated with the search is associated with a role that is allowed to conduct the requested search. Such a determination can be based on a role associated with the search and a group-role mapping 134. Continuing with the above example, if searches relating to e-mail servers, including server A, are allowed to be conducted by users 110 associated with Admin roles (but not by a user 110 associated with User roles), the group-role mapping 134 maps the Engineering Group to the User role (but not the Admin role), and the cached user credentials for the user 110 John Doe indicate the John Doe is associated with the Engineering group, then the search server 102 may determine that the group indicated by the user credentials 136 for the user 110 associated with the search is not associated with a role that is allowed to conduct the requested search. As a result, the search server 102 may not execute the requested search. Conversely, if the cached user credentials for the user 110 John Doe indicate that John Doe is associated with the Sales group (e.g., John Doe is associated with the Sales group only, or both of the Sales group and the Engineering group) and the group-role mapping 134 maps the Sales group to the Admin role, then the search server 102 may determine that the group indicated by the user credentials 136 for the user 110 associated with the search is associated with a role that is allowed to conduct the requested search. As a result, the search server 102 may execute the requested search, as depicted at block 226. Thus, in some embodiments, the search server 102 can determine whether to execute a scheduled search based on cached user credentials 136 that are not expired at or near search time.

Referring to FIG. 2C and process 200c that includes querying an IDP provider for updated cached user credentials and using the updated cached user credentials to verify that a user has sufficient privileges to conduct a search, the search server 102 may determine that it is time for execution of a scheduled search, as depicted at block 230. This determination may be conducted similar to the determination described with regard to block 220 of process 200b illustrated in FIG. 2B. For example, if it is about 1:05 pm it may be determined that that it is time for execution of a second of the scheduled searches associated with the user 110, John Doe. In response to the determining that it is time for execution of a scheduled search associated with the user 110, the search server 102 may determine that the cached user credentials are expired (or missing) as depicted at block 232. Such a determination may be based on an analysis of the cached user credentials in a manner similar to that described with regard to block 222 of process 200b of FIG. 2B. For example, as described above, if is about 1:05 pm (e.g., time for the second of the scheduled searches), the search server 102 may determine that the cached credentials 136 for John Doe have expired. That is, they will have been last updated about 62 min ago (e.g., they are about 62 min old), which is greater than the threshold period of time (or age) of 1 hour. In response to determining that the cached credentials 136 for the user 110 have expired, the search server 102 may query the IDP server 104 for an updated set of credentials for the user 110. Continuing with the above example, the search server 102 may transmit a request for updated user credentials 234 for John Doe to the IDP server 104, and the IDP server 104 may provide updated user credentials 136' for the user 110. The request for updated user credentials 234 can include an identifier of the user 110 (e.g., the string "John_Doe"). The updated user credentials 136' can include an indication of one or more groups currently associated with the user 110. For example, if John_Doe was initially associated with the Engineering group, but his data was modified at about 1:04 pm such that he is also associated with the Sales group, then the set of user credentials 136 provided to the search server 102 at about 12:03 pm (e.g., about the time of log-in) may include an indication that the John_Doe is associated with only the Engineering group (e.g., including the string "John_Doe: Engineering"), but the updated set of user credentials 136' provided to the search server 102 at about 1:05 pm (e.g., about the time of the second scheduled search and after the update of the Group for John_Doe) may include an indication that the John_Doe is associated with both the Engineering group and the Sales group (e.g., including the string "John_Doe:Engineering,Sales"). The search server 102 may cache the updated user credentials 136'. This may be similar to that described with regard to the caching of the user credentials 136 at block 214 of the process 200a of FIG. 2A. For example, the search server 102 may store, in cache memory of the data store 132, the updated user credentials 136' (e.g., including the string "John_Doe:Engineering, Sales") received from the IDP server 104. In some embodiments, the updated user credentials 136' for a user 110 may be stored in place of the previously stored user credentials 136. For example, the updated set of user credentials 136' (e.g., including the string "John_Doe:Engineering,Sales") may be stored in place of the set of user credentials 136 (e.g., including the string "John_Doe:Engineering") that were received from the IDP server 104 as a result of the successful log-in by the user 110 and previously stored in the cache memory of the data store 132.

The search server 102 may determine that the updated cached user credentials 136' are sufficient to conduct the scheduled search, as depicted at block 238. Such a determination may be similar to that described with regard to block 224 of process 200b of FIG. 2B. For example, determining whether the cached user credentials are sufficient to conduct a scheduled search can include determining whether any of the groups indicated by the updated user credentials 136' for the user 110 associated with the search is associated with a role that is allowed to conduct the requested search. Such a determination can be based on a role associated with the search and a group-role mapping 134. Continuing with the above example, if searches relating to e-mail servers, including server A, are allowed to be conducted by persons associated with Admin roles (but not by user associated with User roles), the group-role mapping 134 maps the Engineering Group to the User role (but not the Admin role), and the updated cached user credentials 136' for the user 110 John Doe indicate the John Doe is associated with only the Engineering group, then the search server 102 may determine that the group indicated by the updated cached user credentials 136' for the user 110 associated with the search is not associated with a role that is allowed to conduct the requested search. As a result, the search server 102 may not execute the requested search. Conversely, if the updated cached user credentials 136' for the user 110 John Doe indicate that John Doe is associated with the Sales group (e.g., the Sales group only, or both of the Sales group and the Engineering group) and the group-role mapping 134 maps the Sales group to the Admin role, then the search server 102 may determine that the group indicated by the cached user credentials 136' for the user 110 associated with the search is associated with a role that is allowed to conduct the requested search. As a result, the search server 102 may execute the requested search, as depicted at block 240. Thus, in some embodiments, the search server 102 can determine that cached user credentials are expired, query the IDP server 104 for updated user credentials in response to the determination, cache the updated user credential and use the updated (and unexpired) user credentials to determine whether to execute a scheduled search.

Figure 3:
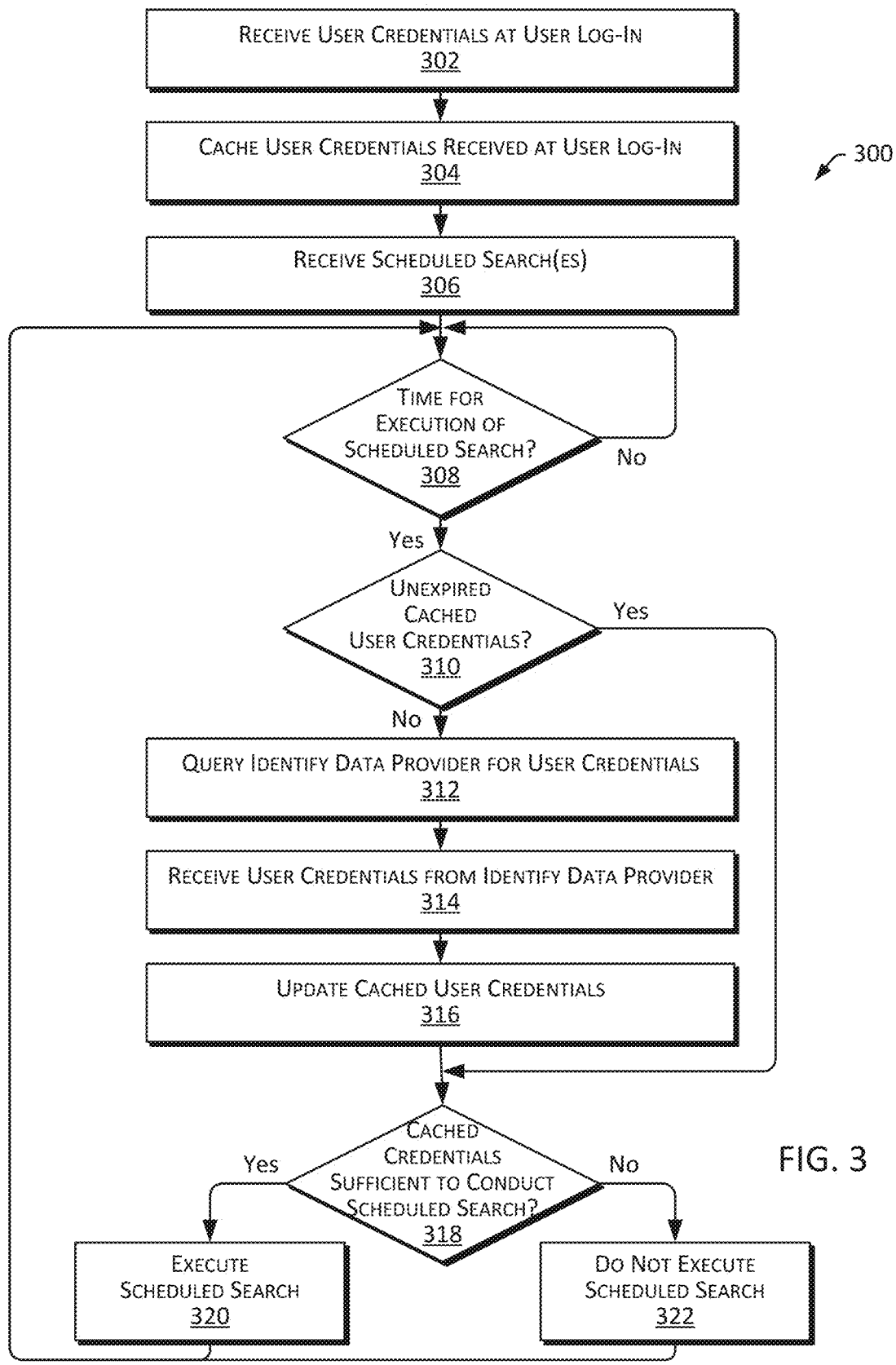
FIG. 3 is a flowchart that illustrates an exemplary method for conducting scheduled searches in accordance with the disclosed embodiments.

FIG. 3 is a flowchart that illustrates an example method 300 for conducting scheduled searches in accordance with the disclosed embodiments. In some embodiments some or all of the steps describe with regard to method 300 can be performed by the search server 102.

Method 300 may include receiving user credentials at user log-in (block 302). In some embodiments, receiving user credentials at user log-in can include the search server 102 receiving user credentials 136 for a user 110 from the IDP server 104 as a result of a successful log-in by the user 110. For example, the search server 102 may receive the user credentials 136 for the user 110 John Doe (including an indication that the John Doe is associated with the Engineering group (e.g., including the string "John_Doe:Engineering")), from the IDP server 104 as a result of a successful log-in by the user 110 John Doe at about 12:03 pm.

Method 300 may include caching the user credentials received at user log-in (block 304). In some embodiments, caching the user credentials received at user log-in can include the search server 102 storing the user credentials 136 in a cache memory of the search server 102. For example, the search server 102 may store, in cache memory of the data store 132, the set of user credentials 136 (e.g., including the string "John_Doe:Engineering") received from the IDP server 104 as a result of the successful log-in by the user 110 John Doe.

Method 300 may include receiving one or more scheduled searches (block 306). In some embodiments, receiving one or more scheduled searches can include the search server 102 receiving one or more searches scheduled 216 submitted by the user 110. For example, the search server 102 may receive, from the client device 106 at about 12:30, a scheduled search submitted by the user 110. The scheduled search may include, for example, a search for events of machine data that was generated by an e-mail server (e.g., server "A") in the last 2 hours and that include a field value indicating central proceeding unit (CPU) usage of greater than 75%. The scheduled search may specify that corresponding searches of machine-generated data are to occur every 5 minutes starting at 1 pm. Thus, the search server 102 may schedule corresponding searches to occur at about 1:00 pm, 1:05 pm, 1:10 pm and so forth.

Method 300 may include determining whether it is time for execution of a scheduled search (block 308). In some embodiments, determining whether it is time for execution of a scheduled search can include the search server 102 comparing the current time to the times at which a search (that has not already been conducted) is scheduled to occur. If the current time is equal to or greater than a time at which a search (that has not already been conducted) is scheduled to occur, then the search server 102 may determine that it is time for execution of a scheduled search. For example, if it is before about 1:00 pm, then the search server 102 may determine that it is not yet time to execute a scheduled search; if it is about 1:00 pm or later, then the search server 102 may determine that it is time to execute the first scheduled search; if it is about 1:03 pm (and the first search has already been executed), then the search server 102 may determine that it is not yet time to execute a scheduled search; if it is about 1:05 pm or later then the search server 102 may determine that it is time to execute the second scheduled search, and so forth. If it is determined that it is not yet time for execution of a scheduled search, the method 300 may continue monitor the time and make similar determinations as to whether it is time for execution of a scheduled search. If it is determined that it is time for execution of a scheduled search, the method 300 may proceed to determining whether the cached use credentials for the user are unexpired (block 310).

In some embodiments, determining whether the cached credentials for the user are unexpired (block 310) includes the search server 102 determining whether user credentials 136 for the user are currently stored in the cache of the server 136 and are unexpired or otherwise still valid. For example, in response to the determining that it is time for execution of the scheduled search associated with the user 110 John Doe, the search server 102 may determine whether the cached credentials 136 for John Doe have expired. In some embodiments, determining whether the cached credentials 136 have expired can include determining when the cached credentials 136 were last updated, and determining whether they were last updated within a threshold period of time. Said another way, determining whether the cached credentials 136 have expired can include determining whether the cached credentials 136 are less than a given age. If for example, the threshold period of time (or age) is 1 hour, the cached credentials 136 were last updated when they were received at log-in at about 12:03 pm and it is currently about 1:00 pm (the time for the first of the scheduled searches), then the search server 102 may determine that the cached credentials 136 for John Doe have not yet expired. That is, they were last updated about 57 min ago (e.g., they are about 57 min old), which is less than the threshold period of time (or age) of 1 hour. Conversely, if it is about 1:05 pm (the time for the second scheduled search), then the search server 102 may determine that the cached credentials 136 for John Doe have expired. That is, they will have been last updated about 62 min ago (e.g., they are about 62 min old), which is greater than the threshold period of time (or age) of 1 hour. If it is determined that the cached user credentials are expired (or are not present in the cache), the method 300 may proceed to querying the IDP provider for user credentials (block 312). If it is determined that the cached user credentials are not expired, the method 300 may proceed to determining whether the cached user credentials are sufficient to conduct the scheduled search (block 318).

In some embodiments, querying the IDP provider for user credentials (block 312) can include the search server 102 querying the IDP server 104 for updated user credentials. For example, the search server 102 may transmit a request for updated user credentials 234 to the IDP server 104. The request for updated user credentials 234 can include in identifier of the user 110 (e.g., the string "John_Doe").

The method 300 may include receiving user credentials from the IDP (block 314). In some embodiments, receiving user credentials from the IDP includes the search server 102 receiving updated user credentials 136' from the IDP server 104. The updated user credentials 136' can include an indication of one or more groups currently associated with the user 110. For example, if John Doe was initially associated with the Engineering group, but his data was modified at about 1:04 pm such that he is also associated with the Sales group, then the set of user credentials 136 provided to the search server 102 at about 12:03 pm (the time of log-in) may include an indication that the John Doe is associated with only the Engineering group (e.g., including the string "John_Doe:Engineering"), but the updated set of user credentials 136' provided to the search server 102 at about 1:05 pm (the time of the second scheduled search) may include an indication that the John Doe is associated with both the Engineering group and the Sales group (e.g., including the string "John_Doe:Engineering,Sales"). In some embodiments, if the search server 102 determines that the user's credentials have changed (e.g., the groups(s) associated with a user have changed and/or the like), then the search server may automatically query the IDP 104 for an updated set of user credentials. Thus, the search server 102 may maintain an updated set of credentials for the user 110.

The method 300 may include updating the cached user credentials (block 316). In some embodiments, updating the cached user credentials can include the search server 102 updating the user credentials 136 currently stored in cache to reflect the updated user credentials 136'. For example, the search server 102 may store, in cache memory of the data store 132, the updated user credentials 136' (e.g., including the string "John_Doe:Engineering,Sales") received from the IDP server 104. In some embodiments, the updated user credentials 136' for a user 110 may be stored in place of the user credentials 136 currently stored in the cache memory. For example, the updated set of user credentials 136' (e.g., including the string "John_Doe:Engineering,Sales") may be stored in place of the set of user credentials 136 (e.g., including the string "John_Doe:Engineering") that were received from the IDP server 104 as a result of the successful log-in by the user 110 and stored in the cache memory of the data store 132. Thus, the updated user credentials 136' may transition to the role of the credentials 136, and can later be modified in view of newer, updated user credentials 136' received at a later time.

The method 300 may include determining whether the cached user credentials are sufficient to conduct the scheduled search (block 318). In some embodiments, determining whether the cached user credentials are sufficient to conduct a scheduled search can include the search server 102 determining whether any of the group(s) indicated by the current cached user credentials 136 for the user 110 associated with the search is associated with a role that is allowed to conduct the requested search. Such a determination can be based on a role associated with the search and a group-role mapping 134. Continuing with the above example, if searches relating to e-mail servers, including server A, are allowed to be conducted by persons associated with Admin roles (but not by user associated with User roles), the group-role mapping 134 maps the Engineering Group to the User role (but not the Admin role), and the cached user credentials 136 for the user 110 John Doe indicate the user 110 John Doe is associated with the Engineering group, then the search server 102 may determine that the group indicated by the user credentials 136 for the user 110 associated with the search is not associated with a role that is allowed to conduct the requested search. Conversely, if the cached user credentials for the user 110 John Doe indicate that the user 110 John Doe is associated with the Sales group (e.g., the Sales group only, or both of the Sales group and the Engineering group) and the group-role mapping 134 maps the Sales group to the Admin role, then the search server 102 may determine that at least one of the groups indicated by the user credentials 136 for the user 110 associated with the search is associated with a role that is allowed to conduct the requested search.

If it is determined that the cached user credentials are not sufficient to conduct the scheduled search, then the method 300 may not execute the search (block 322). If it is determined that the cached user credentials are sufficient to conduct the scheduled search, then the method 300 may proceed to executing the search (block 320). In some embodiments, executing the search can include the search server 102 initiating the search process. For example, the search sever 102 may send, to one or more search head of the back-end search system 120, a request to search for events of machine data that was generated by an e-mail server (e.g., server "A") in the last 2 hours and that include a field value indicating central proceeding unit (CPU) usage of greater than 75%. As described herein, the search head(s) may employ one or more indexers to search the various indexes for events meeting the search criteria, the search head(s) may receive corresponding results from the indexers, the search head(s) may consolidate the results, and provide the results to the search server 102 for use generating corresponding reports, for example.

Figure 4:
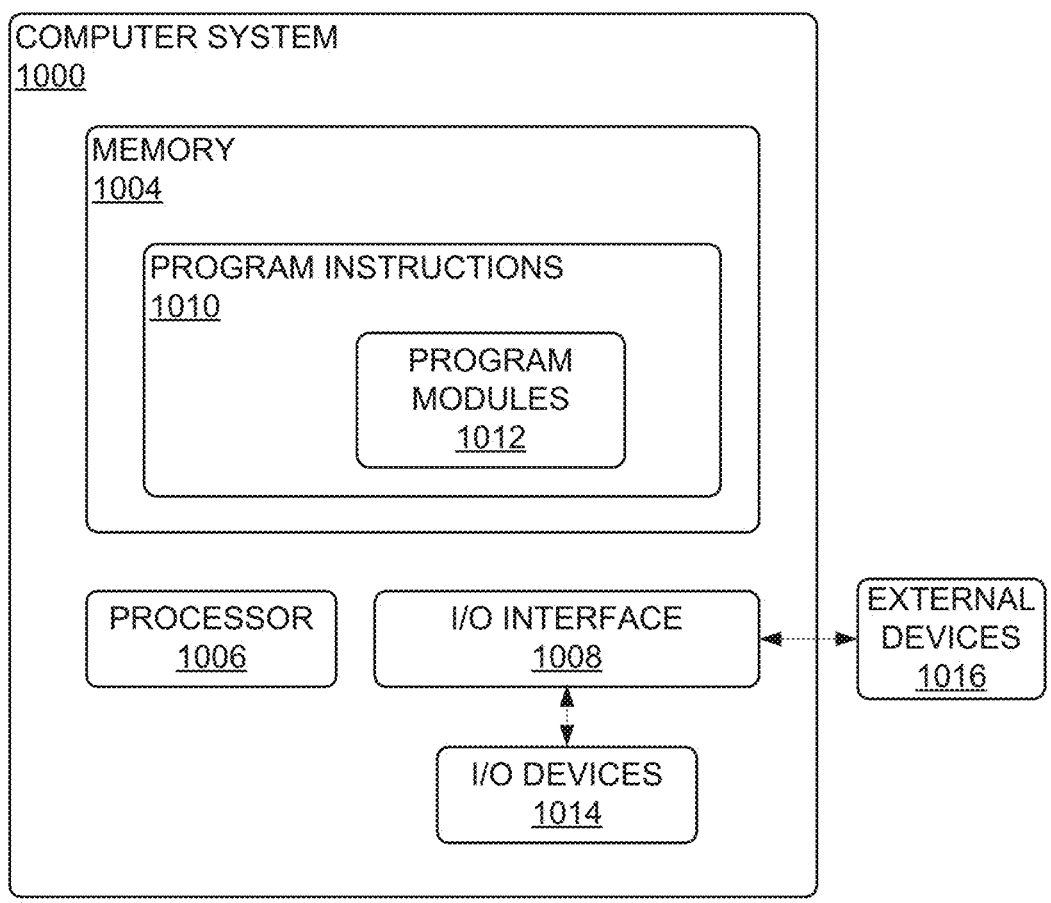
FIG. 4 is a diagram that illustrates an exemplary computer system in accordance with the disclosed embodiments.

FIG. 4 is a diagram that illustrates an example computer system 1000 in accordance with one or more embodiments. In some embodiments, the computer system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The program instructions 1010 may include program modules 1012 that are executable by a computer processor (e.g., the processor 1006) to cause the functional operations described herein, including, for example, one or more of the processes 200a, 200b and 200c, and/or the method 300. In the context of a computer system of the client device 106, the program modules 1012 may include one or more modules for performing some or all of the operations described with regard to the client device 106. In the context of a computer system of the search server 102, the program modules 1012 may include a one or more modules (e.g., the search management module 130) for performing some or all of the operations described with regard to the search server 102. In the context of a computer system of the IDP server 104, the program modules 1012 may include a one or more modules (e.g., the identity management module 130) for performing some or all of the operations described with regard to the IDP server 104.

The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 1006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI)), and/or the like. The I/O devices 1014 may include one or more of the user input devices. The I/O devices 1014 may be connected to the I/O interface 1008 via a wired or a wireless connection. The I/O interface 1008 may provide an interface for communication with one or more external devices 1016, such as other computers, networks, and/or the like. In some embodiments, the I/O interface 1008 may include an antenna, transceiver, and/or the like.

Accordingly, provided in some embodiments are systems and methods for verifying user credentials for searching. In some embodiments, user credentials can be verified prior to conducting a search that is associated with a user. For example, if a user requests to conduct a search of machine-generated data to locate segments of the data (such as "events" described herein) that satisfy specified search criteria, the user's credentials can be verified prior to conducting the search. In some embodiments, the credentials can be retrieved from a local cache memory, and do not need to be from a remote location, such as an Identity Service Provider (IDP). As described herein, in some embodiments, the verifying search credentials can be applied to searches of machine-data that employ a late binding schema. For example, the describe verification of user credentials can be conducted at search time, for a search that employs a late-binding schema to identify one or more event records of a set of indexed event records that each include a portion of raw-machine generated data and are each time-stamped or otherwise associated with a particular time. The following describes an example data system that may employ the described embodiments, including employing one or more searches of machine-generated data using the above described techniques.

1.1 Overview of Example Performance Data System

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that can include different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements, and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce time-stamped events. The system stores the time-stamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

Figure 5:
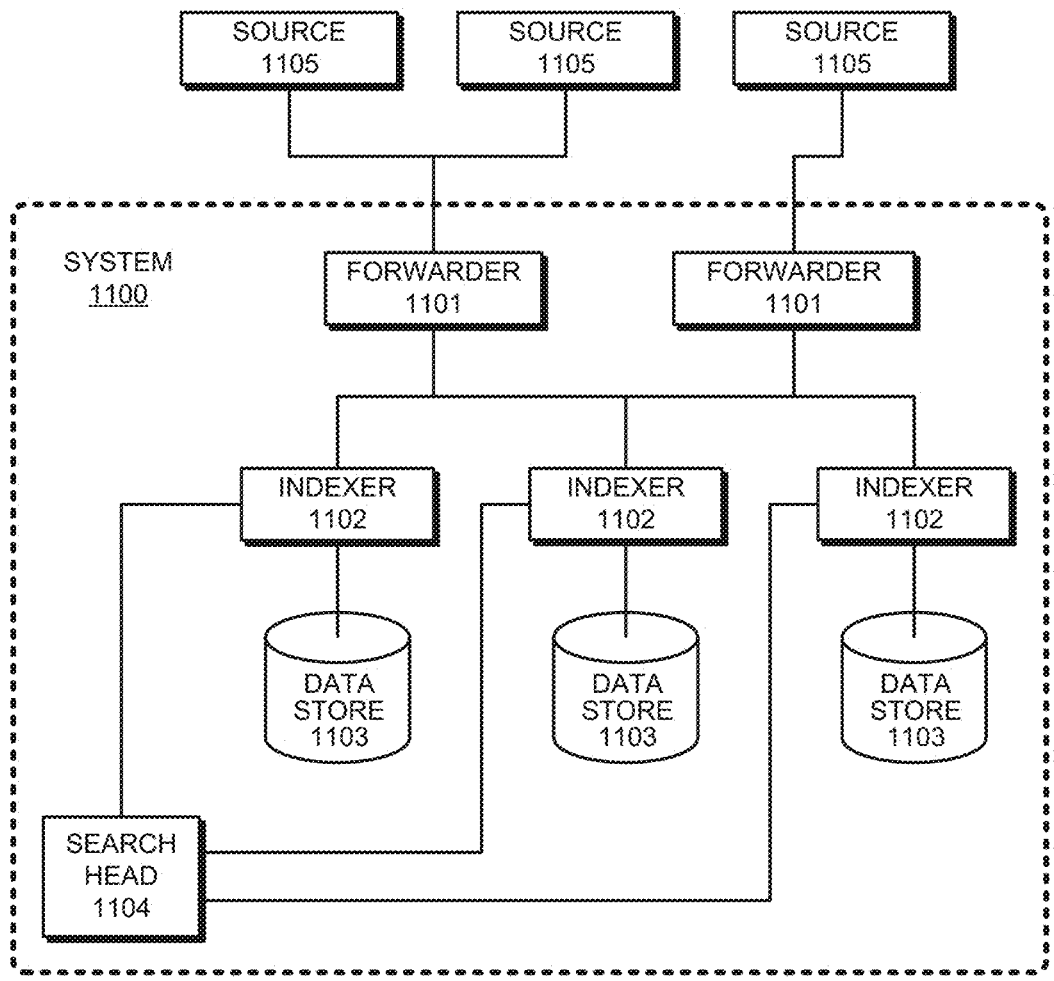
FIG. 5 presents a block diagram of an exemplary event-processing system in accordance with the disclosed embodiments.

FIG. 5 presents a block diagram of an exemplary event-processing system 1100, similar to the SPLUNK® ENTERPRISE system. System 1100 includes one or more forwarders 1101 that collect data obtained from a variety of different data sources 1105, and one or more indexers 1102 that store, process, and/or perform operations on this data, wherein each indexer operates on data contained in a specific data store 1103. These forwarders and indexers can comprise separate computer systems in a data center, or may alternatively comprise separate processes executing on various computer systems in a data center.

During operation, the forwarders 1101 identify which indexers 1102 will receive the collected data and then forward the data to the identified indexers. Forwarders 1101 can also perform operations to strip out extraneous data and detect timestamps in the data. The forwarders 1101 next determine which indexers 1102 will receive each data item and then forward the data items to the determined indexers 1102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 1100 and the processes described below with respect to FIGS. 5-9 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 6:
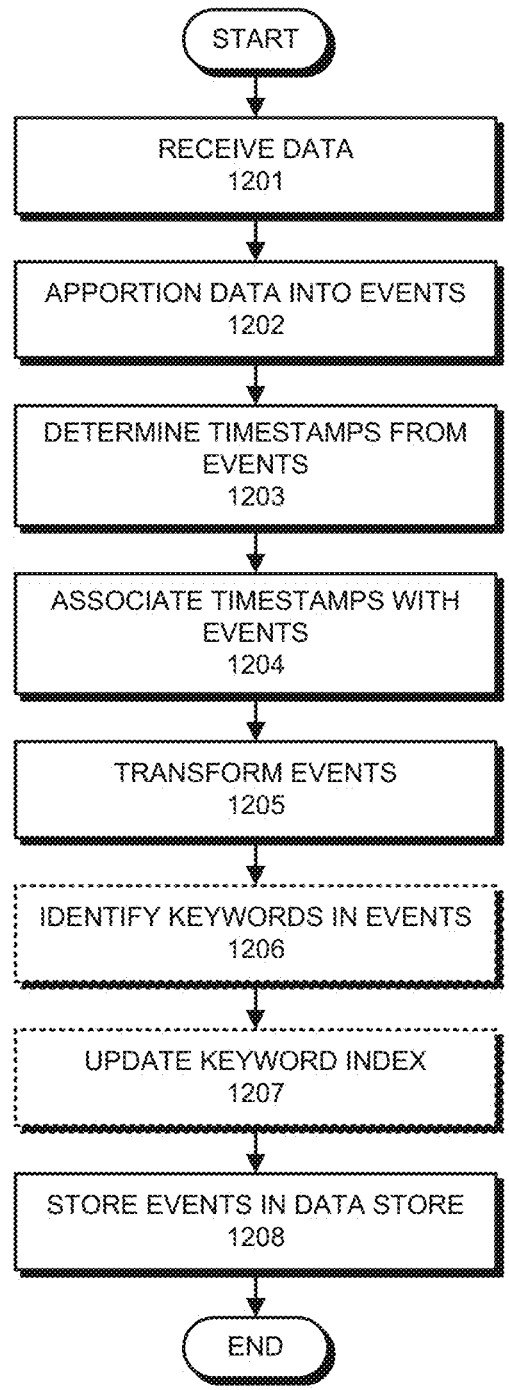
FIG. 6 presents a flowchart illustrating an example of how indexers process, index, and store data received from forwarders in accordance with the disclosed embodiments.

FIG. 6 presents a flowchart illustrating how an indexer processes, indexes, and stores data received from forwarders in accordance with the disclosed embodiments. At block 1201, the indexer receives the data from the forwarder. Next, at block 1202, the indexer apportions the data into events. Note that the data can include lines of text that are separated by carriage returns or line breaks, and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces, or line breaks. In some cases, a user can fine-tune or configure the rules that the indexers use to determine event boundaries in order to adapt the rules to the user's specific requirements.

Next, the indexer determines a timestamp for each event at block 1203. As mentioned above, these timestamps can be determined by extracting the time directly from the data in the event, or by interpolating the time based on timestamps from temporally proximate events. In some cases, a timestamp can be determined based on the time the data was received or generated. The indexer subsequently associates the determined timestamp with each event at block 1204, for example, by storing the timestamp as metadata for each event.

Then, the system can apply transformations to data to be included in events at block 1205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in events in block 1206. Then, at block 1207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or a colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 1208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 1102 is responsible for storing and searching a subset of the events contained in a corresponding data store 1103. By distributing events among the indexers and data stores, the indexers can analyze events for a query in parallel, for example, using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on Apr. 30 2014, and in U.S. patent application Ser. No. 14/266,817 also filed on Apr. 30, 2014, which are hereby incorporated by reference.

1.4 Query Processing

Figure 7:
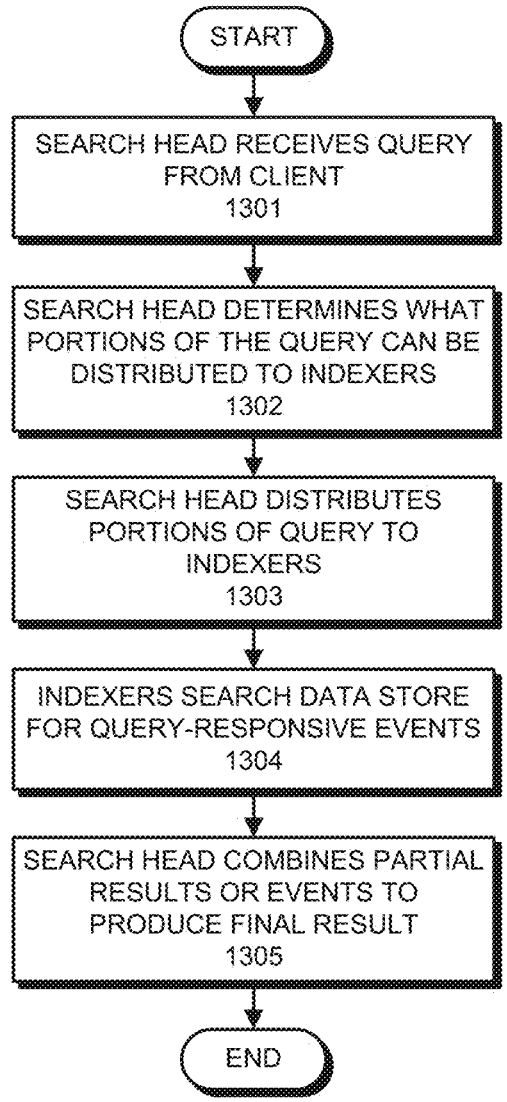
FIG. 7 presents a flowchart illustrating an example of how a search head and indexers perform a search query in accordance with the disclosed embodiments.

FIG. 7 presents a flowchart illustrating how a search head and indexers perform a search query in accordance with the disclosed embodiments. At the start of this process, a search head receives a search query from a client at block 1301. Next, at block 1302, the search head analyzes the search query to determine what portions can be delegated to indexers and what portions need to be executed locally by the search head. At block 1303, the search head distributes the determined portions of the query to the indexers. Note that commands that operate on single events can be trivially delegated to the indexers, while commands that involve events from multiple indexers are harder to delegate.

Then, at block 1304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 1304 may involve using the late-binding scheme to extract values for specified fields from events at the time the query is processed. Next, the indexers can either send the relevant events back to the search head, or use the events to calculate a partial result, and send the partial result back to the search head.

Finally, at block 1305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by the system 1100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these settings to query the indexers to obtain a superset of the eventual results. Then, during a filtering stage, the search head can perform field-extraction operations on the superset to produce a reduced set of search results.

1.5 Field Extraction

Figure 8:
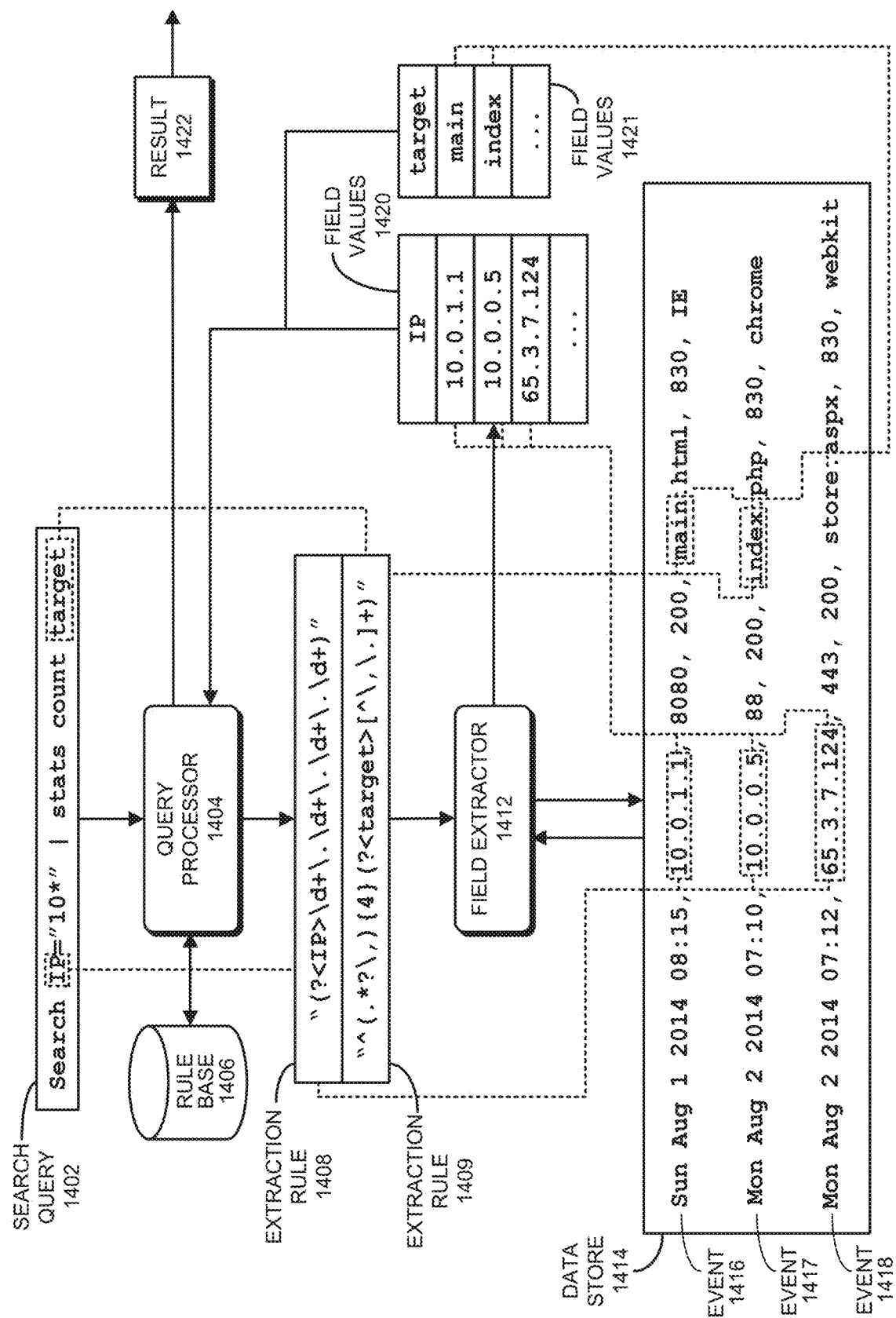
FIG. 8 presents a block diagram of an exemplary system for processing search requests that uses extraction rules for field values in accordance with the disclosed embodiments.

FIG. 8 presents a block diagram illustrating how fields can be extracted during query processing in accordance with the disclosed embodiments. At the start of this process, a search query 1402 is received at a query processor 1404. Query processor 1404 includes various mechanisms for processing a query, wherein these mechanisms can reside in a search head 1104 and/or an indexer 1102. Note that the exemplary search query 1402 illustrated in FIG. 8 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 1402 can also be expressed in other query languages, such as the Structured Query Language (SQL) or any suitable query language.

Upon receiving search query 1402, query processor 1404 sees that search query 1402 includes two fields "IP" and "target." Query processor 1404 also determines that the values for the "IP" and "target" fields have not already been extracted from events in data store 1414, and consequently determines that query processor 1404 needs to use extraction rules to extract values for the fields. Hence, query processor 1404 performs a lookup for the extraction rules in a rule base 1406, wherein the rule base 1406 maps field names to corresponding extraction rules and obtains extraction rules 1408-1409, wherein extraction rule 1408 specifies how to extract a value for the "IP" field from an event, and extraction rule 1409 specifies how to extract a value for the "target" field from an event. As is illustrated in FIG. 8, extraction rules 1408-1409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or a value retrieved by the extraction rule. For example, a transformation rule may truncate a character string, or convert the character string into a different data format. In some cases, the query itself can specify one or more extraction rules.

Next, query processor 1404 sends extraction rules 1408-1409 to a field extractor 1412, which applies extraction rules 1408-1409 to events 1416-1418 in a data store 1414. Note that data store 1414 can include one or more data stores, and extraction rules 1408-1409 can be applied to large numbers of events in data store 1414, and are not meant to be limited to the three events 1416-1418 illustrated in FIG. 8. Moreover, the query processor 1404 can instruct field extractor 1412 to apply the extraction rules to all of the events in a data store 1414, or to a subset of the events that have been filtered based on some criteria.

Next, field extractor 1412 applies extraction rule 1408 for the first command "Search IP="10*"" to events in data store 1414 including events 1416-1418. Extraction rule 1408 is used to extract values for the IP address field from events in data store 1414 by looking for a pattern of one or more digits, followed by a period, followed again by one or more digits, followed by another period, followed again by one or more digits, followed by another period, and followed again by one or more digits. Next, field extractor 1412 returns field values 1420 to query processor 1404, which uses the criterion IP="10*" to look for IP addresses that start with "10". Note that events 1416 and 1417 match this criterion, but event 1418 does not, so the result set for the first command is events 1416-1417.

Query processor 1404 then sends events 1416-1417 to the next command "stats count target." To process this command, query processor 1404 causes field extractor 1412 to apply extraction rule 1409 to events 1416-1417. Extraction rule 1409 is used to extract values for the target field for events 1416-1417 by skipping the first four commas in events 1416-1417, and then extracting all of the following characters until a comma or period is reached. Next, field extractor 1412 returns field values 1421 to query processor 1404, which executes the command "stats count target" to count the number of unique values contained in the target fields, which in this example produces the value "2" that is returned as a final result 1422 for the query.

Note that the query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or a chart, generated from the values.

1.6 Exemplary Search Screen

Figure 10A:
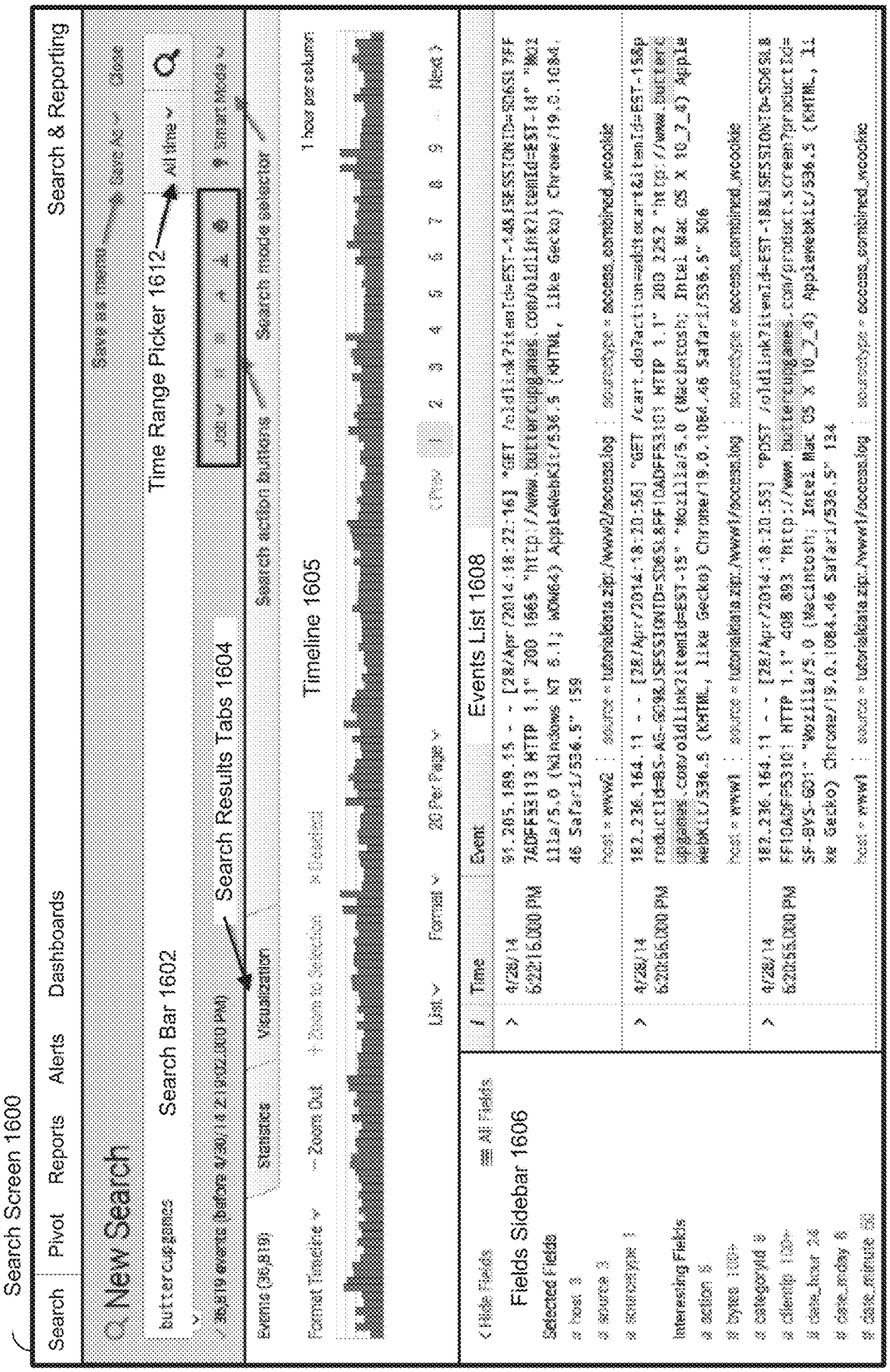
FIG. 10A illustrates an exemplary search screen in accordance with the disclosed embodiments.
Figure 10B:
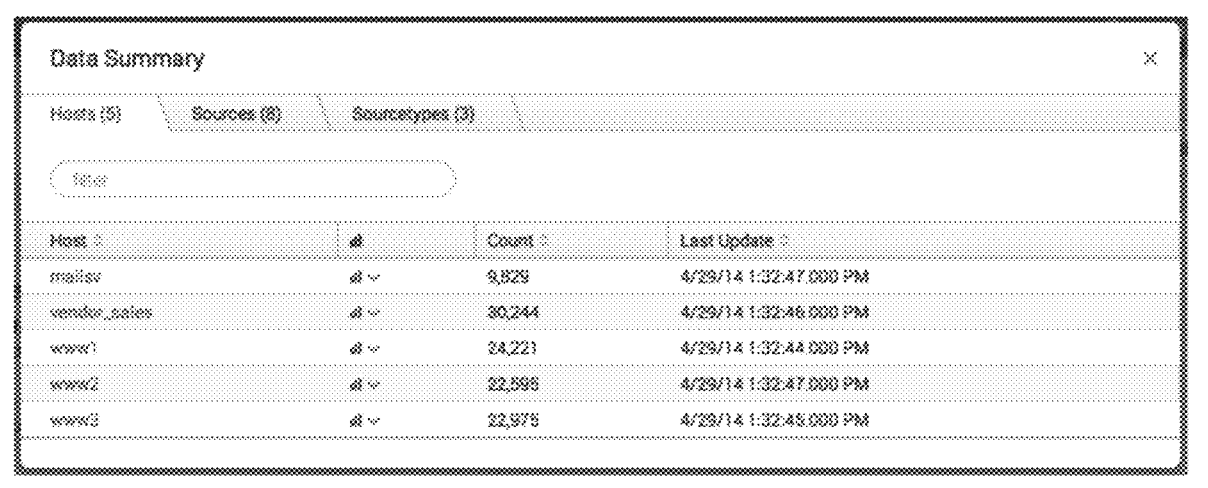

FIG. 10A illustrates an exemplary search screen 1600 in accordance with the disclosed embodiments. Search screen 1600 includes a search bar 1602 that accepts user input in the form of a search string. It also includes a time range picker 1612 that enables the user to specify a time range for the search. For "historical searches," the user can select a specific time range, or alternatively a relative time range, such as "today," "yesterday," or "last week." For "real-time searches," the user can select the size of a preceding time window to search for real-time events. Search screen 1600 also initially displays a "data summary" dialog as is illustrated in FIG. 10B that enables the user to select different sources for the event data, for example, by selecting specific hosts and log files.

After the search is executed, the search screen 1600 can display the results through search results tabs 1604, wherein search results tabs 1604 include: an "events tab" that displays various information about events returned by the search; a "statistics tab" that displays statistics about the search results; and a "visualization tab" that displays various visualizations of the search results. The events tab illustrated in FIG. 10A displays a timeline graph 1605 that graphically illustrates the number of events that occurred in one-hour intervals over the selected time range. It also displays an events list 1608 that enables a user to view the raw data in each of the returned events. It additionally displays a fields sidebar 1606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 9 illustrates how a search query 1501 received from a client at search head 1104 can split into two phases, including: (1) a "map phase" comprising subtasks 1502 (e.g., data retrieval or simple filtering) that may be performed in parallel and are "mapped" to indexers 1102 for execution, and (2) a "reduce phase" comprising a merging operation 1503 to be executed by the search head when the results are ultimately collected from the indexers.

During operation, upon receiving search query 1501, search head 1104 modifies search query 1501 by substituting "stats" with "prestats" to produce search query 1502, and then distributes search query 1502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 5, or may alternatively distribute a modified version (e.g., a more restricted version) of the search query to the search peers. In this example, the indexers are responsible for producing the results and sending them to the search head. After the indexers return the results to the search head, the search head performs the merging operations 1503 on the results. Note that by executing the computation in this way, the system effectively distributes the computational operations while minimizing data transfers.

1.7.2 Keyword Index

As described above with reference to the flowcharts in FIGS. 6 and 7, the event-processing system 1100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of the system 1100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014, which is hereby incorporated by reference.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether the generation of updated reports can be accelerated by creating intermediate summaries. (This is possible if results from preceding time periods can be computed separately and combined to generate an updated report. In some cases, it is not possible to combine such incremental results, for example, where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that matches the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011, which are hereby incorporated by reference.

1.8 Security Features

The SPLUNK® ENTERPRISE platform provides various schemas, dashboards, and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volumes, uniform resource locator strings, and source addresses. The process of detecting security threats for network-related information is further described in U.S. patent application Ser. Nos. 13/956,252, and 13/956,262, which are hereby incorporated by reference. Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 11A:
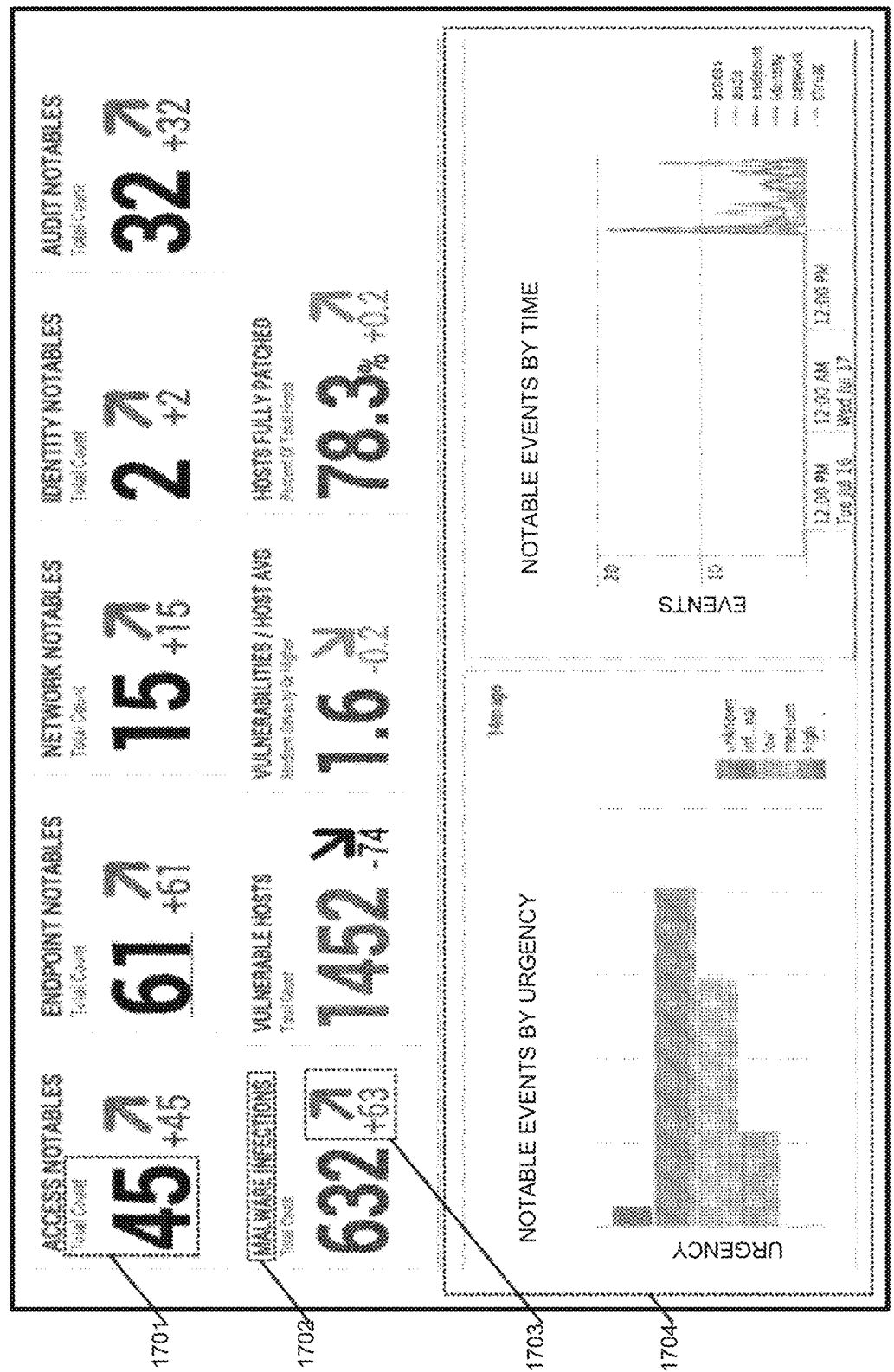
FIG. 11A illustrates an exemplary key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 11A illustrates an exemplary key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338 filed Jul. 31, 2013, which is hereby incorporated by reference.

Figure 11B:
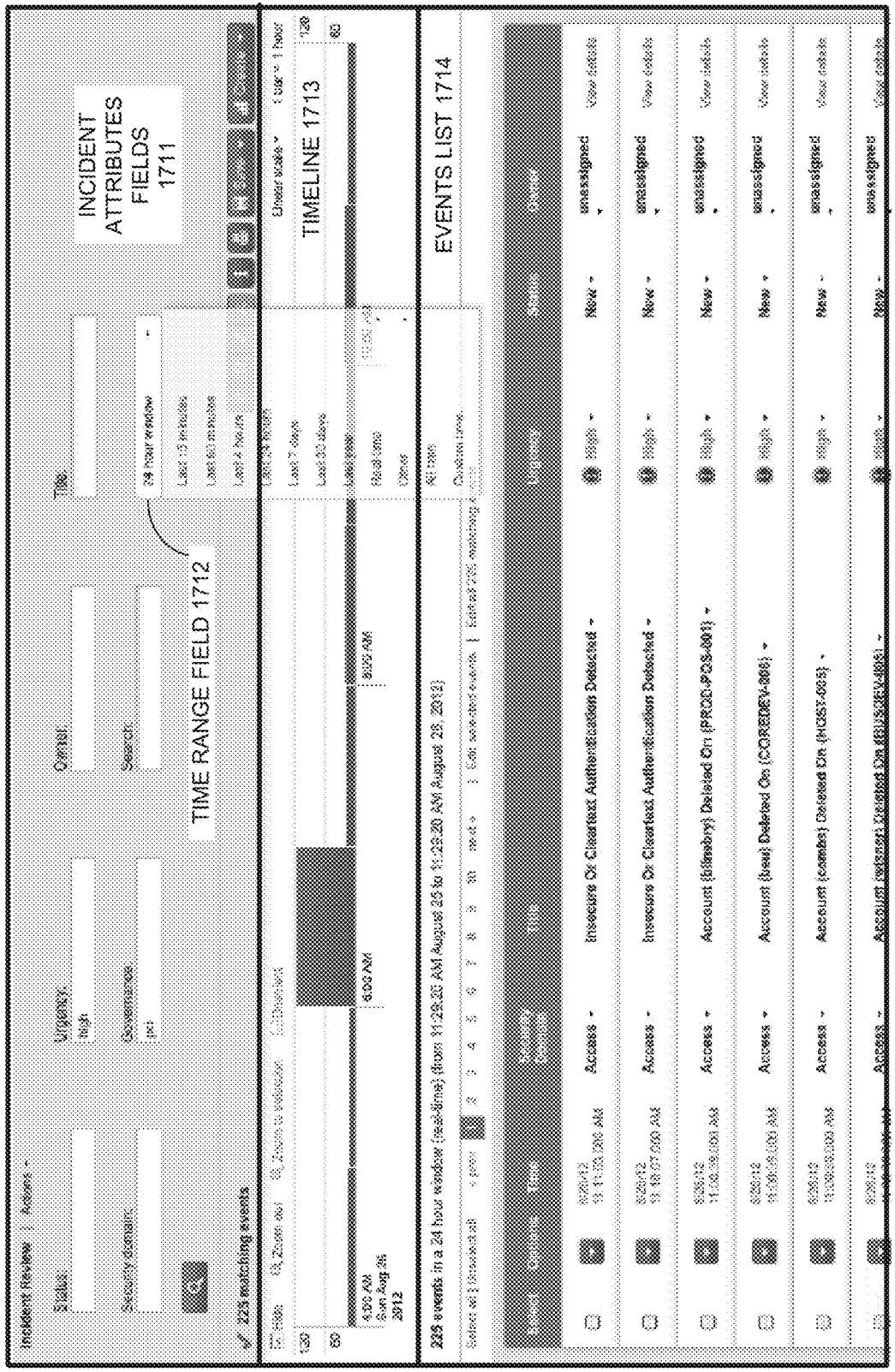
FIG. 11B illustrates an exemplary incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 11B illustrates an exemplary incident review dashboard 1710 that includes a set of incident attribute fields 1711 that, for example, enables a user to specify a time range field 1712 for the displayed events. It also includes a timeline 1713 that graphically illustrates the number of incidents that occurred in one-hour time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example, by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167, 316 filed Jan. 29, 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 11C:
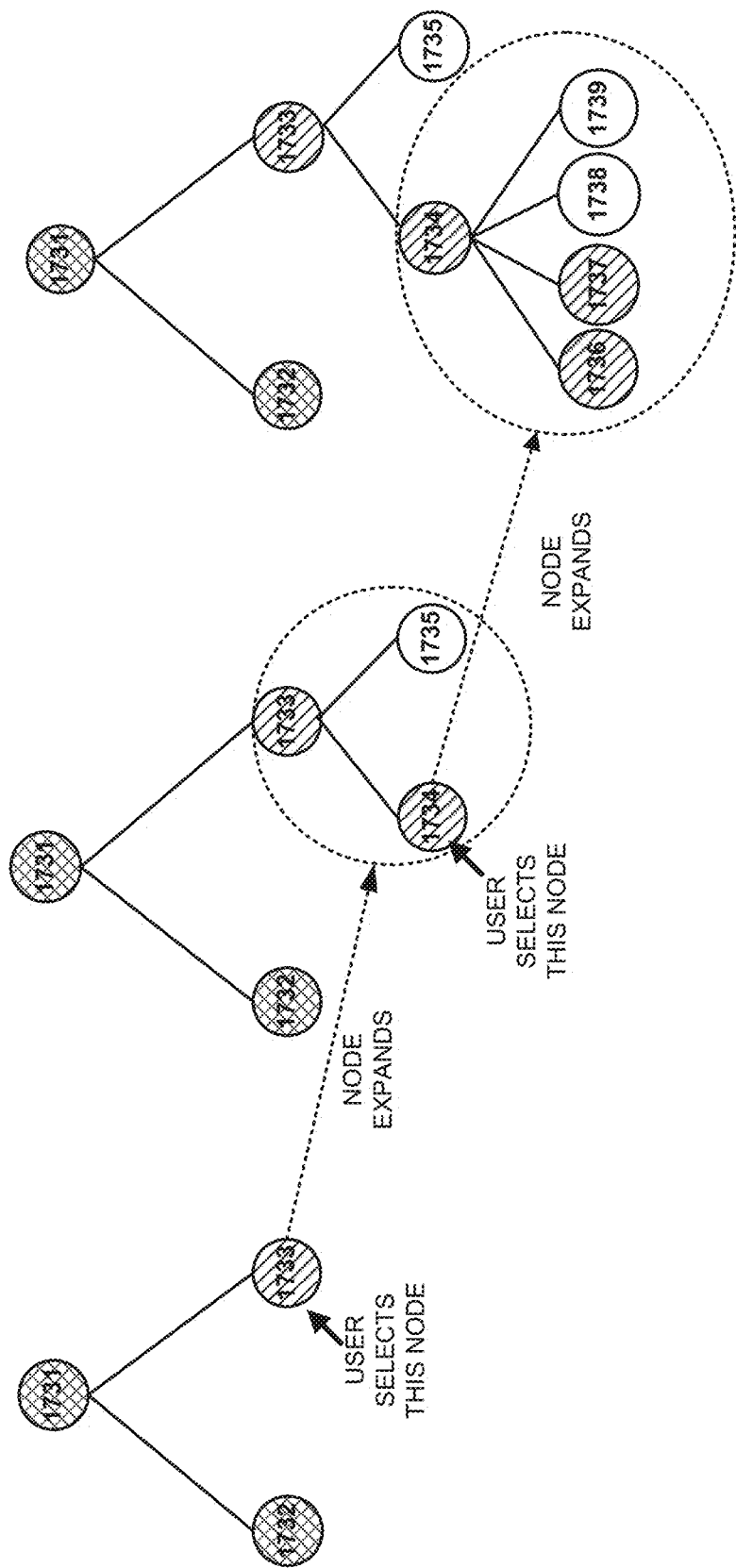
FIG. 11C illustrates an exemplary proactive monitoring tree in accordance with the disclosed embodiments.
Figure 11D:
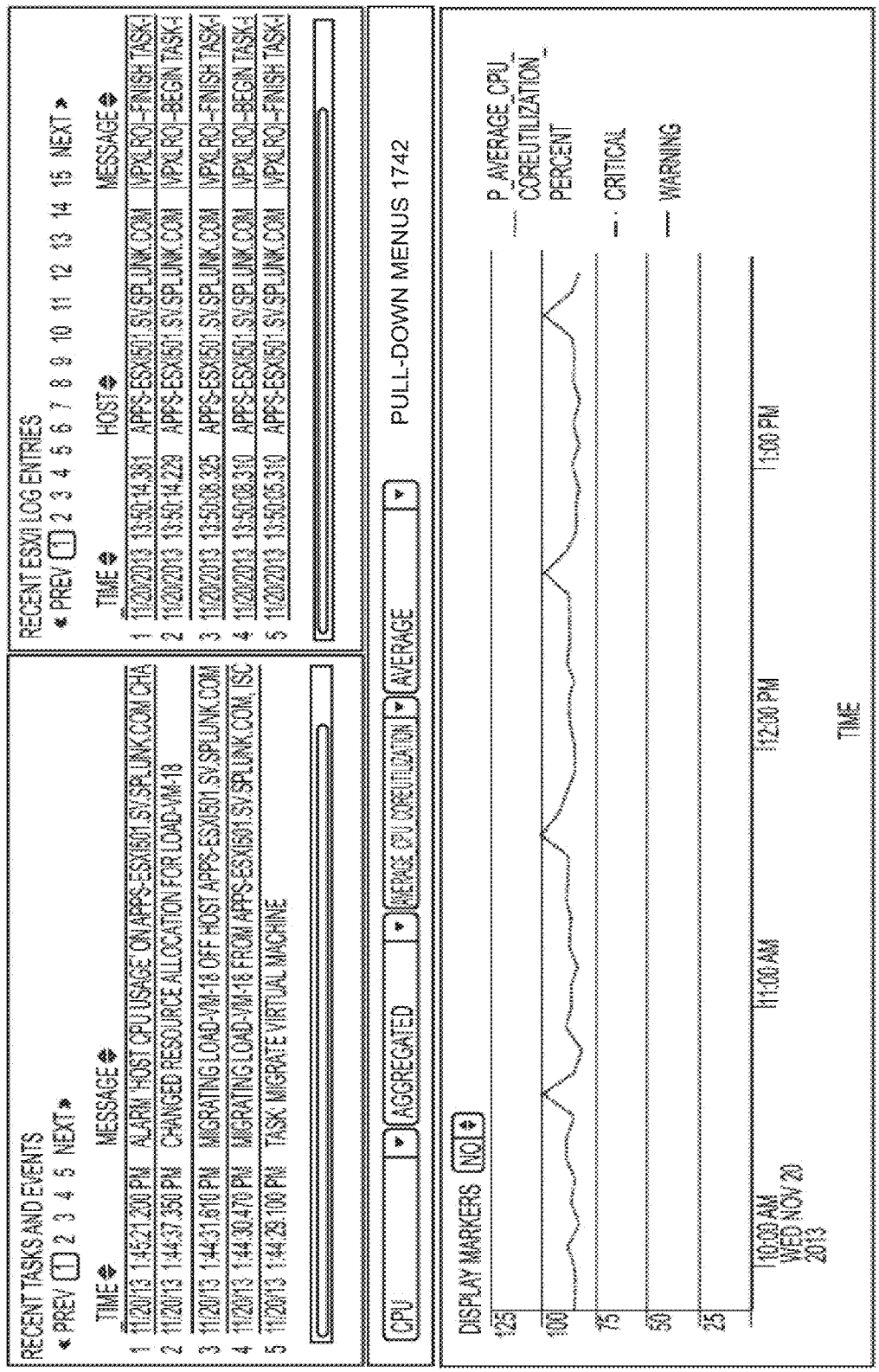
FIG. 11D illustrates an exemplary screen displaying both log data and performance data in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 11C, wherein nodes 1733 and 1734 are selectively expanded. Note that nodes 1731-1739 can be displayed using different patterns or colors to represent different performance states, such as a critical state, a warning state, a normal state, or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on Apr. 15, 2014, which is hereby incorporated by reference.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 11D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on Jan. 29, 2014, which is hereby incorporated by reference.

Further modifications and embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

It will be appreciated that the methods described are example embodiments of methods that may be employed in accordance with the techniques described herein. The methods may be modified to facilitate variations of their implementation and use. The order of the methods and the operations provided therein may be changed, and various elements may be added, reordered, combined, omitted, modified, etc. Portions of the methods may be implemented in software, hardware, or a combination thereof. Some or all of the portions of the methods may be implemented by one or more of the processors/modules/applications described herein.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A method comprising:
receiving, from a user while the user is logged onto a data search server, a scheduled search request at the data search server to perform a scheduled search of a datastore of events at a defined frequency, the data search server for receiving the scheduled search request and returning the results of the scheduled search request, each event of the datastore comprising:

a segment apportioned during ingestion to the datastore from machine data received from a particular source among a plurality of sources, and an associated metadata timestamp determined at the time of the ingestion for the segment apportioned; and while the user is continually logged off of the data search server:

at a first time specified by the defined frequency:

determining whether the user has privileges to perform the search based at least in part on a cached set of user credentials, the cached set of user credentials received from an identity provider server and stored in cache memory of the data search server, and causing, in response to determining that the user has privileges to perform the scheduled search, the scheduled search to identify a first result based at least in part on a first set of one or more of the events of the machine generated data that are responsive to the scheduled search, and at a second time specified by the defined frequency:

determining whether the cached set of user credentials has been updated within a period of time, querying, in response to determining that the cached set of user credentials have not been updated within the period of time, the identity provider server for a current set of user credentials associated with the user, receiving the current set of user credentials, determining whether the user has privileges to perform the search based at least in part on the current set of user credentials, and causing, in response to determining that the user has privileges to perform the search, the scheduled search to be performed to identify a second result based at least in part on a second set of one or more of the events of the machine generated data that are responsive to the scheduled search.

2. The method of claim 1, further comprising:
updating the cached set of user credentials with the current set of user credentials retrieved at the second time.

3. The method of claim 1, wherein the scheduled search request comprises an end time.

4. The method of claim 1, further comprising:
terminating the scheduled search at the defined frequency upon receiving a termination from the user.

5. The method of claim 1, further comprising:
updating the cached set of user credentials with the current set of user credentials retrieved at the second time; and at a third time specified by the defined frequency and after the second time:

determining whether the user has privileges to perform the search based at least in part on the cached set of user credentials, and causing, in response to determining that the user has privileges to perform the scheduled search, the scheduled search to identify a third result based at least in part on a third set of one or more of the events of the machine generated data that are responsive to the scheduled search.

6. The method of claim 1, wherein querying the identity provider server for the current set of user credentials associated with the user comprises submitting, to the identity provider server, a query request identifying the user.

7. The method of claim 1, wherein receiving the current set of user credentials comprises receiving a group identifier associated with the user.

8. The method of claim 1,
wherein querying the identity provider server for the current set of user credentials associated with the user comprises submitting, to the identity provider server, a query request identifying the user, wherein receiving the current set of user credentials comprises receiving a group identifier of a group of the user, the group comprising a plurality of users comprising the user, and wherein determining whether the user has privileges to perform the search based at least in part on the set of user credentials comprises:

accessing a mapping of groups to user roles;

determining a role of the user based on the group identifier and the mapping of groups to user roles;

determining a role allowed to initiate the search; and comparing the role of the user to the role allowed to initiate the search to determine whether the user has privileges to perform the search.

9. The method of claim 1, further comprising:
receiving a second set of user credentials associated with the user, wherein the second set of user credentials is provided in response to the user logging into a search application; and updating the set of user credentials stored in the cache memory to correspond to the second set of user credentials.

10. The method of claim 1, further comprising:
receiving a second request to perform a second search associated with the user;

determining whether a set of user credentials stored in the cache memory, have been updated within the period of time;

identifying, in response to determining that the credentials for the user have been updated within the period of time, whether the user has privileges to perform the search based at least in part on the set of user credentials stored in the cache memory; and causing, in response to determining that the user has privileges to perform the search, the search to be performed.

11. The method of claim 1, wherein querying the identity provider server for a current set of user credentials associated with the user comprises sending a Security Assertion Markup Language (SAML) message to the identity provider server for a current set of user credentials associated with the user.

12. The method of claim 1, wherein receiving the current set of user credentials comprises receiving the current set of user credentials via a Security Assertion Markup Language (SAML) message sent by the identity provider server.

13. The method of claim 1, wherein the search comprises employing late-binding schema to identify the first set of one or more of the events of the machine generated data that are responsive to the search.

14. A system comprising:
one or more processors;
cache memory; and
one or more memories comprising program instructions stored thereon that are executable by the one or more processors to cause:

receiving, from a user while the user is logged onto a data search server, a scheduled search request at the data search server to perform a scheduled search of a datastore of events at a defined frequency, the data search server for receiving the scheduled search request and returning the results of the scheduled search request, each event of the datastore comprising:
- a segment apportioned during ingestion to the datastore from machine data received from a particular source among a plurality of sources, and
- an associated metadata timestamp determined at the time of the ingestion for the segment apportioned, and while the user is continually logged off of the data search server:
- at a first time specified by the defined frequency:
  - determining whether the user has privileges to perform the search based at least in part on a cached set of user credentials, the cached set of user credentials received from an identity provider server and stored in the cache memory of the data search server, and
  - causing, in response to determining that the user has privileges to perform the scheduled search, the scheduled search to identify a first result based at least in part on a first set of one or more of the events of the machine generated data that are responsive to the scheduled search, and
- at a second time specified by the defined frequency:
  - determining whether the cached set of user credentials has been updated within a period of time,
  - querying, in response to determining that the cached set of user credentials have not been updated within the period of time, the identity provider server for a current set of user credentials associated with the user,
  - receiving the current set of user credentials,
  - determining whether the user has privileges to perform the search based at least in part on the current set of user credentials, and
  - causing, in response to determining that the user has privileges to perform the scheduled search, the search to be performed to identify a second result based at least in part on a second set of one or more of the events of the machine generated data that are responsive to the scheduled search.

15. The system of claim 14, wherein the program instructions stored thereon are further executable by the one or more processors to cause:
updating the cached set of user credentials with the current set of user credentials retrieved at the second time.

16. The system of claim 14, wherein the scheduled search request comprises an end time.

17. The system of claim 14, wherein the program instructions stored thereon are further executable by the one or more processors to cause:
updating the cached set of user credentials with the current set of user credentials retrieved at the second time; and
at a third time specified by the defined frequency and after the second time:
determining whether the user has privileges to perform the search based at least in part on the cached set of user credentials, and
causing, in response to determining that the user has privileges to perform the scheduled search, the scheduled search to identify a third result based at least in part on a third set of one or more of the events of the machine generated data that are responsive to the scheduled search.

18. The system of claim 14, wherein the program instructions stored thereon are further executable by the one or more processors to cause:
receiving a second set of user credentials associated with the user, wherein the second set of user credentials is provided in response to the user logging into a search application; and
updating the set of user credentials stored in the cache memory to correspond to the second set of user credentials.

19. The system of claim 14, wherein the program instructions stored thereon are further executable by the one or more processors to cause:
receiving a second request to perform a second search associated with the user;
determining whether a set of user credentials stored in the cache memory have been updated within the period of time;
identifying, in response to determining that the credentials for the user have been updated within the period of time, whether the user has privileges to perform the search based at least in part on the set of user credentials stored in the cache memory; and
causing, in response to determining that the user has privileges to perform the search, the search to be performed.

20. The system of claim 14, wherein querying the identity provider server for a current set of user credentials associated with the user comprises sending a Security Assertion Markup Language (SAML) message to the identity provider server for a current set of user credentials associated with the user.

21. The system of claim 14, wherein the search comprises employing late-binding schema to identify the first set of one or more of the events of the machine generated data that are responsive to the search.

22. One or more non-transitory computer-readable medium comprising program instructions stored thereon that are executable by one or more processors to cause:
receiving, from a user while the user is logged onto a data search server, a scheduled search request at the data search server to perform a scheduled search of a datastore of events at a defined frequency, the data search server for receiving the scheduled search request and returning the results of the scheduled search request, each event of the datastore comprising:
- a segment apportioned during ingestion to the datastore from machine data received from a particular source among a plurality of sources, and
- an associated metadata timestamp determined at the time of the ingestion for the segment apportioned; and while the user is continually logged off of the data search server:
at a first time specified by the defined frequency:
determining whether the user has privileges to perform the search based at least in part on a cached set of user credentials, the cached set of user credentials received from an identity provider server and stored in cache memory of the data search server, and
causing, in response to determining that the user has privileges to perform the scheduled search, the scheduled search to identify a first result based at least in part on a first set of one or more of the events of the machine generated data that are responsive to the scheduled search, and at a second time specified by the defined frequency:
determining whether the cached set of user credentials has been updated within a period of time,
querying, in response to determining that the credentials have not been updated within the period of time, the identity provider server for a current set of user credentials associated with the user,
receiving the current set of user credentials,
determining whether the user has privileges to perform the search based at least in part on the current set of user credentials, and
causing, in response to determining that the user has privileges to perform the search, the scheduled search to be performed to identify a second result based at least in part on a second set of one or more of the events of the machine generated data that are responsive to the scheduled search.

23. The medium of claim 22, wherein the program instructions stored thereon are further executable by the one or more processors to cause:
updating the cached set of user credentials with the current set of user credentials retrieved at the second time.

24. The medium of claim 22, wherein the scheduled search comprises an end time.

25. The medium of claim 22, wherein the program instructions stored thereon are further executable by the one or more processors to cause:
updating the cached set of user credentials with the current set of user credentials retrieved at the second time; and
at a third time specified by the defined frequency and after the second time:
determining whether the user has privileges to perform the search based at least in part on the cached set of user credentials, and
causing, in response to determining that the user has privileges to perform the scheduled search, the scheduled search to identify a third result based at least in part on a third set of one or more of the events of the machine generated data that are responsive to the scheduled search.

26. The medium of claim 22, wherein the program instructions stored thereon are further executable by the one or more processors to cause:
receiving a second set of user credentials associated with the user, wherein the second set of user credentials is provided in response to the user logging into a search application; and
updating the set of user credentials stored in the cache memory to correspond to the second set of user credentials.

27. The medium of claim 22, wherein the program instructions stored thereon are further executable by the one or more processors to cause:
receiving a second request to perform a second search associated with the user;
determining whether a set of user credentials stored in the cache memory, have been updated within the period of time;
identifying, in response to determining that the credentials for the user have been updated within the period of time, whether the user has privileges to perform the search based at least in part on the set of user credentials stored in the cache memory; and
causing, in response to determining that the user has privileges to perform the search, the search to be performed.

28. The medium of claim 22, wherein querying the identity provider server for a current set of user credentials associated with the user comprises sending a Security Assertion Markup Language (SAML) message to the identity provider server for a current set of user credentials associated with the user.

29. The medium of claim 22, wherein the search comprises employing late-binding schema to identify the first set of one or more of the events of the machine generated data that are responsive to the search.

* * * * *